United States Patent
Inoki et al.

(10) Patent No.: US 11,432,235 B2
(45) Date of Patent: Aug. 30, 2022

(54) WIRELESS COMMUNICATION CONTROL METHOD, WIRELESS COMMUNICATION SYSTEM, AND MANAGEMENT SERVER

(71) Applicant: NIPPON TELEGRAPH AND TELEPHONE CORPORATION, Tokyo (JP)

(72) Inventors: Akiyoshi Inoki, Yokosuka (JP); Keisuke Wakao, Yokosuka (JP); Hirantha Abeysekera, Yokosuka (JP); Munehiro Matsui, Yokosuka (JP); Kenichi Kawamura, Yokosuka (JP); Yasushi Takatori, Yokosuka (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 16/978,171

(22) PCT Filed: Feb. 27, 2019

(86) PCT No.: PCT/JP2019/007688
§ 371 (c)(1),
(2) Date: Sep. 3, 2020

(87) PCT Pub. No.: WO2019/172055
PCT Pub. Date: Sep. 12, 2019

(65) Prior Publication Data
US 2020/0413327 A1   Dec. 31, 2020

(30) Foreign Application Priority Data
Mar. 5, 2018  (JP) .............................. JP2018-038952

(51) Int. Cl.
*H04W 4/00*         (2018.01)
*H04L 12/28*        (2006.01)
(Continued)

(52) U.S. Cl.
CPC .......... *H04W 48/18* (2013.01); *H04B 17/318* (2015.01); *H04W 16/14* (2013.01);
(Continued)

(58) Field of Classification Search
CPC ..... H04W 48/18; H04W 16/14; H04W 24/02; H04W 48/20; H04W 72/085; H04B 17/318
(Continued)

(56) References Cited

U.S. PATENT DOCUMENTS

2008/0137624 A1* 6/2008 Silverstrim ............ G08B 21/12
                                                        370/338
2008/0139213 A1* 6/2008 Coersmeier ........... H04W 88/10
                                                        455/450

(Continued)

FOREIGN PATENT DOCUMENTS

JP   2017-175205 A    9/2017
WO   WO-2017012583 A1 1/2017

OTHER PUBLICATIONS

IEEE Std 802.11TM—2016, Dec. 2016.
(Continued)

*Primary Examiner* — Mark G. Pannell
(74) *Attorney, Agent, or Firm* — Harness, Dickey & Pierce, P.L.C.

(57) ABSTRACT

Provided is a wireless communication control method, in which a management server manages line selection of an unlicensed band/licensed band of a UE and manages parameters of the unlicensed band, including a control step of excluding the UE that uses the licensed band from an optimization target in an unlicensed band system and optimizing the parameters of the unlicensed band in consideration of existence of an STA and the UE that uses the unlicensed band, which is caused by the management server.

(Continued)

Furthermore, a pattern when a total of a communication capacity in the unlicensed band and a communication capacity in the licensed band after the optimization of the parameters of the unlicensed band becomes high is adopted for the line selection of the UE, and the parameters of the unlicensed band after the optimization of the line selection are set for an AP, the STA, and the UE of the unlicensed band.

12 Claims, 14 Drawing Sheets

(51) Int. Cl.
  *H04W 48/18* (2009.01)
  *H04B 17/318* (2015.01)
  *H04W 16/14* (2009.01)
  *H04W 24/02* (2009.01)
  *H04W 48/20* (2009.01)
  *H04W 72/08* (2009.01)

(52) U.S. Cl.
  CPC ........... *H04W 24/02* (2013.01); *H04W 48/20* (2013.01); *H04W 72/085* (2013.01)

(58) Field of Classification Search
  USPC ........................................................ 370/329
  See application file for complete search history.

(56) References Cited

U.S. PATENT DOCUMENTS

| | | | | |
|---|---|---|---|---|
| 2009/0225682 | A1* | 9/2009 | Grote-Lopez | H04L 41/083 370/255 |
| 2011/0250858 | A1* | 10/2011 | Jain | H04W 16/14 455/120 |
| 2013/0166580 | A1* | 6/2013 | Maharajh | H04W 4/18 707/758 |
| 2013/0337821 | A1* | 12/2013 | Clegg | H04W 24/08 455/452.1 |
| 2014/0315593 | A1* | 10/2014 | Vrzic | H04W 52/228 455/522 |
| 2014/0328190 | A1* | 11/2014 | Lord | H04W 24/08 370/252 |
| 2014/0378157 | A1* | 12/2014 | Wei | H04W 16/14 455/454 |
| 2018/0206235 | A1 | 7/2018 | Zhu et al. | |

OTHER PUBLICATIONS

Yoji Kozaki and Yoshitaka Nishii, "Learn Systematically Wi-Fi/3G/4G/LTE/WIMAX", Nikkei Business Publications Inc., Jan. 21, 2015, pp. 240-241.

Nokia Networks, "On LAA Multi-Carrier Power Allocation", 3GPP Draft; R1-1556-1, 3rd Generation Partnership Project (3GPP), Mobile Competence Centre; 650, Route Des Lucioles: F-06921 Sophia-Anti Polis Cedex; France vol. RAN WG1, No. Malmo, Sweden; Oct. 5-Oct. 9, 2015, Oct. 4, 2015, XP051002465.

* cited by examiner (1) Method 1

(2) Method 2

Transmission Power: Large     Transmission Power: Small (3) Method 3

Transmission Power: Large     Transmission Power: Small (4) Method 4

Transmission Power: Large     Transmission Power: Small (1) Method 5
Reception Sensitivity Threshold: Low Reception Sensitivity Threshold: High (2) Method 6
Reception Sensitivity Threshold: Low Reception Sensitivity Threshold: High (3) Method 7
Frequency A   Frequency B Frequency A (4) Method 8
Frequency A   Frequency B Frequency A

WIRELESS COMMUNICATION CONTROL METHOD, WIRELESS COMMUNICATION SYSTEM, AND MANAGEMENT SERVER

CROSS-REFERENCE TO RELATED APPLICATIONS

This application is a 371 U.S. National Phase of International Application No. PCT/JP2019/007688, filed on Feb. 27, 2019, which claims priority to Japanese Application No. 2018-038952, filed on Mar. 5, 2018. The entire disclosures of the above applications are incorporated herein by reference.

TECHNICAL FIELD

The present invention relates to a wireless communication control method, a wireless communication system, and the management server in which a management server on the network side controls a use line of a terminal device (UE), and the management server optimizes setting parameters for the unlicensed band wireless access for the UE equipped with a communication interface for both unlicensed band wireless access and licensed band wireless access using a carrier sense multiple access (CSMA) method.

BACKGROUND ART

In a wireless local area network (LAN) system in compliance with the IEEE 802.11 standard (Non-patent Document 1), unlicensed band wireless access using the CSMA method is adopted, and throughput is improved year by year, and is widely used as one principal wireless access. Furthermore, in a cellular communication system using the licensed band, the number of terminal devices (UE) including an interface for wireless LAN communication in addition to an interface for cellular communication is increasing like smartphones in recent years.

However, in the unlicensed band wireless access using the CSMA method, communication that uses the unlicensed band does not require a license and can be used by anyone, and in communication of the CSMA method, quality and a communication capacity thereof may be significantly deteriorated due to an interference problem caused by a nature of a communication protocol based on carrier sensing.

For selection of the unlicensed band and the licensed band in the terminal device (UE), according to Non-Patent Document 2, connection is made in the order of the unlicensed band of the wireless LAN to the licensed band of the LTE. That is, the terminal device (UE) selects a line by its own decision with a flow of connecting to the LTE if the wireless LAN does not exist.

On the other hand, according to Patent Document 1, optimization of various parameters in the wireless LAN system is performed in a closed manner in the wireless LAN system, and is not a factor for line selection from the unlicensed band of the wireless LAN to the licensed band of LTE in the terminal device (UE).

PRIOR ART DOCUMENT

Patent Document

Patent Document 1: Japanese Unexamined Patent Application Publication No. 2017-175205

Non-Patent Documents

Non-Patent Document 1: IEEE Std 802.11TM-2016, December 2016.

Non-Patent Document 2: Yoji KOZAK and Yoshitaka NISHII, "Learn Systematically Wi-Fi/3G/4G/LTE/WIMAX"

DISCLOSURE OF THE INVENTION

Problems to be Solved by the Invention

When the terminal device (UE) preferentially connects to the wireless LAN, even if the communication quality of the wireless LAN is low, connection is made only by the existence of the wireless LAN. The terminal device (UE) of which the communication quality of the wireless LAN is low may not only deteriorate its own communication quality, but may cause a reduction in the communication quality of other wireless terminals that use the wireless LAN due to retransmission of signals and a low transmission rate and, eventually, a reduction in the communication capacity of the wireless LAN system as a whole.

Further, in the wireless LAN, there is a possibility that the communication capacity is increased by adjusting the parameters such as transmission power, reception sensitivity threshold, frequency, and frequency width. However, in order to secure the communication quality of the terminal device in a service area, it is necessary to perform optimization calculation of the parameters and set the parameters for all the terminal devices connected to the wireless LAN or expected to be connected thereto (Patent Document 1). As a result, since it is necessary to secure a radio wave strength and avoid interference throughout the service area, there is no choice but to sacrifice some chances to expand the communication capacity such as increasing of transmission opportunity by adjusting transmission power or reception sensitivity threshold, and improving communication band by adjusting frequency or frequency width.

Incidentally, in order to implement a high transmission rate, it is necessary that the SINR of a received signal on a reception side is high, and thus it is necessary that a reception radio wave strength (=S) is high and noise strength (=N) and the interfering radio wave strength (=I) are low. When the reception radio wave strength is low or an interfering radio wave exists, it is necessary to lower the transmission rate for successful communication. In this case, an amount of data that can be exchanged at the same time is reduced as compared with the time of high transmission rate.

In the CSMA method, it is possible to confirm an available situation of the line by carrier sensing and to transmit a signal when it is determined to be idle. In order to increase the communication capacity, it is necessary to have the opportunity to become idle with carrier sensing. Accordingly, in the unlicensed band wireless access using the CSMA method of the wireless LAN or the like, it is necessary to reduce contention with other wireless stations in carrier sensing while maintaining a situation where the radio wave strength of interference is low and the frequency of interference is low while obtaining high reception signal strength.

It is noted that. In the CSMA method, there is a possibility that a hidden station problem/exposed station problem may occur which causes a significant deterioration in communication quality. This occurs when a plurality of signals transmitted by being determined as idle by carrier sensing are received by both devices at a certain point.

FIG. 13 illustrates the situation of the hidden station problem/exposed station problem. Here, A1, A2, and A3 indicate wireless LAN base stations AP, and STA indicates a terminal device corresponding to a wireless LAN of unlicensed band. The dotted-line circle indicates a coverage area according to a reception sensitivity threshold or a carrier sense threshold at the base station AP.

FIG. 13(1) illustrates the exposed station problem on a transmission side, where carrier sensing does not work between A1 and A2 and signals are transmitted independently of each other. On the other hand, if carrier sensing is performed by A3, since A3 becomes busy due to radio waves from A1 and A2, the more A1 and A2 transmit signals, the more the opportunity to become idle with carrier sensing is significantly reduced at A3, and the communication quality is significantly reduced.

FIG. 13(2) illustrates the hidden station problem on the reception side, in which carrier sensing does not work between A1 and A2, and signals are transmitted independently of each other. On the other hand, since not only the signal of A1 but also the signal of A2 reaches the STA, the signal of A2 interferes with the signal transmitted from A1 and the SINR decreases. That is, the more A2 transmits signals, the more the signal from A1 to the STA is subjected to interference, it is noted that A1 cannot detect the signal from A2, and thus A1 cannot grasp that the STA is being subjected to interference. Accordingly, when A1 transmits a signal having a high transmission rate to the STA based on the premise that the STA is not subjected to interference, in the STA, signal demodulation falls due to interference, retransmission and packet loss occur, communication quality deteriorates, and communication capacity of the entire unlicensed band system decreases due to the waste of radio resources. Although A1 can send a signal having a low transmission rate to the STA based on the premise that the STA is being subjected to interference, the transmission rate is low, and even in a case where STA is not subjected to interference, there is a possibility that the transmission rate will remain low.

It is noted that, in the wireless LAN in compliance with IEEE 802.11 standard, a mechanism called RTS/CTS is prepared for the hidden station problem. However, in the situation of FIG. 13(2), even if A1 transmits the RTS to the STA, the STA is interfered by A2, and thus it becomes busy in carrier sensing of the STA and the CrS cannot be returned to A1, and an expected effect may not be obtained.

Further, the communication band is increased as a usable frequency width becomes wider. In the wireless LAN in compliance with IEEE 802.11 standard, it is possible to select the communication band from a plurality of bands such as 20 MHz width, 40 MHz width, 80 MHz width, and 160 MHz width, and it is possible to set to use a wide frequency width such as 160 MHz.

Incidentally, if it is attempted to cover a service area that is too large for one AP with only APs of unlicensed band, as illustrated in FIG. 13(3) or FIG. 13(4), there is no choice but to allow the overlap of service areas of a plurality of APs. When the frequencies of all APs are the same, there is a possibility that the hidden station problem may occur in FIG. 13(3) as illustrated in FIG. 13(2). Furthermore, in order to avoid the hidden station problem, when A3 is installed in an overlap area of A1 and A2 as illustrated in FIG. 13(4), the exposed station problem occurs as illustrated in FIG. 13(1). As such, the overlap of service areas causes the hidden station problem/exposed station problem to occur, and thus there is an idea of segregating by frequency in order to avoid the occurrence of the hidden station problem/exposed station problem. However, since the radio frequency of the unlicensed band is limited, a wide communication band using a wide frequency width cannot be implemented, and even when the frequencies are segregated, if the AP density is high, there is a possibility of being unable to cope with.

Here, the wireless terminal (UE) having a plurality of communication interfaces for unlicensed band wireless access and licensed band wireless access can use the licensed band for communication even if the unlicensed band cannot be used. Accordingly, for the UE, if the use of the licensed band is prioritized and the use of the unlicensed band is limited, there is no problem even if quality of the unlicensed band is low for the UE.

Hereinafter, a method of increasing the communication capacity of the entire system will be described with reference to FIGS. 14 and 15. In FIG. 14 and FIG. 15, A1 to A3 are base stations AP, UE is a terminal device compatible with the wireless LAN of unlicensed band and the LTE of licensed band, and STA is a terminal device compatible only with the wireless LAN of unlicensed band. The dotted-line circle indicates the coverage area according to the transmission power, the reception sensitivity threshold, or the frequency at the base station AP.

In Method 1 of FIG. 14(1), when A1 is connected to the UE and the STA in the unlicensed band, the UE having a weak radio wave strength and a low transmission rate with A1 is allowed to use a licensed band and the radio resource of the unlicensed band is allocated to the STA having a high radio wave strength and a high transmission rate with A1.

In Method 2 of FIG. 14(2), when A1 and the UE are connected in the unlicensed band, the transmission power of the unlicensed band is lowered in order to reduce interference with others, and the UE which is outside the coverage area at that time is allowed to use the licensed band.

In Method 3 of FIG. 14(3), when A1 and the UE are connected in the unlicensed band, the transmission power of the unlicensed band of A1 and A2 is lowered in order to reduce interference with others, and the UE which is affected by the hidden station problem/exposed station problem at that time is allowed to use the licensed band.

In Method 4 of FIG. 14(4), when A1 and the UE are connected in the unlicensed band, the transmission power of the unlicensed band of A2 and A3 is lowered in order to reduce interference with others, and the UE which is affected by the hidden station problem/exposed station problem at that time is allowed to use the licensed band.

In Method 5 of FIG. 15(1), when A1 and the UE are connected in the unlicensed band, the reception sensitivity thresholds in the unlicensed band of A1 and A2 are increased to increase the opportunity to become idle with carrier sensing, and the UE which is affected by the hidden station problem/exposed station problem at that time is allowed to use the licensed band.

In Method 6 of FIG. 15(2), when A1 and the UE are connected in the unlicensed band, the reception sensitivity thresholds in the unlicensed band of A2 and A3 are increased to increase the opportunity to become idle with carrier sensing, and the UE which is affected by the hidden station problem/exposed station problem at that time is allowed to use the licensed band.

In Method 7 of FIG. 15(3), when A1 and A2 use different frequencies A and 8, and A1 and the UE are connected in the unlicensed band, if A1 and A2 use the same frequency A, the UE which is affected by the hidden station problem/exposed station problem at that time is allowed to use the licensed band.

In Method 8 of FIG. 15(4), when A2 and A3 use different frequencies A and B, and A1 and the UE are connected in the unlicensed band, if A2 and A3 use the same frequency A, the UE which is affected by the hidden station problem/exposed station problem and at that time is allowed to use the licensed band.

It is noted that, although each of the examples illustrated in FIGS. 14 and 15 has the effect of increasing the communication capacity in the unlicensed band, when the terminal device STA corresponding to only the unlicensed band also exists, there are also elements that reduce the communication quality, such as a decrease in transmission rate and the effect of hidden station problem/exposed station problem for those terminal devices. Accordingly, it is necessary to distinguish the STA from the UE, and suppress the deterioration of the communication quality due to the control illustrated in FIGS. 14 and 15 for the STA.

For examples of Methods 2, 3, and 4, if the transmission power of the AP is lowered, the coverage area is reduced, and the UE and the STA that cannot detect the AP occur. In this case, originally, although it is better to use the unlicensed band for the entire system, there is a possibility that a UE that cannot detect the AP and cannot use the unlicensed band occurs, or that the STA is outside the service area and communication itself is not possible for the STA. For that reason, when lowering the transmission power of the AP, it is necessary to consider changes in the coverage area. However, when the transmission power of APs is not uniformly reduced but the transmission power is lowered for each STA or UE, or only for a signal that satisfies a specific condition, the AP can be detected by the STA or the UE, and thus it is not necessary to consider the change in the coverage area. For example, when the transmission power of a beacon signal that the AP periodically transmits or a probe response signal that is replied to a probe request from the STA or the UE is not lowered, the STA or the UE can detect the AP.

A proposition of the present invention is to provide a wireless communication control method, a wireless communication system, and a management server in which control of transmission power, reception sensitivity threshold, frequency and frequency width which are unlicensed band parameters and selection of a line of licensed band and a line of unlicensed band used by the UE can be performed in consideration of the existence of the STA that can use only the unlicensed band, so that communication quality of STAs and UEs can be secured, and further communication capacity of the entire system can be improved.

Means for Solving the Problems

According to a first invention, there is provided a wireless communication control method, in which a base station AP of an unlicensed band, a base station BS of a licensed band, a terminal station STA of the unlicensed band, and a terminal station UE corresponding to the licensed band and the unlicensed band are provided and a management server manages line selection of the unlicensed band/licensed band of the UE and manages parameters of the unlicensed band, the method including a control step of excluding the UE that uses the licensed band from an optimization target in an unlicensed band system and optimizing the parameters of the unlicensed band in consideration of existence of the STA and the UE that uses the unlicensed band, by the management server.

In the wireless communication control method according to the first invention, in the control step, a pattern when a total of a communication capacity in the unlicensed band and a communication capacity in the licensed band after the optimization of the parameters of the unlicensed band becomes high is adopted for the line selection of the UE, and the parameters of the unlicensed band after the optimization of the line selection are set for the AP, the STA, and the UE of the unlicensed band.

In the wireless communication control method according to the first invention, in the control step, a transmission power, a reception sensitivity threshold, a frequency, and a frequency width are adjusted as the parameters of the unlicensed band, a parameter that allows a low transmission rate and occurrence of a hidden station problem/exposed station problem is set for a place where the STA or the UE that uses the unlicensed band does not exist in a service area of the AP.

In the wireless communication control method according to the first invention, in the control step, selection of the UE that uses the licensed band is decided based on information on a radio wave strength between a connecting AP and the UE, information on the radio wave strength between a neighboring AP of the UE and a neighboring AP of the connecting AP, and information on an amount of communication in the connecting AP, the neighboring AP of the UE, and the neighboring AP of the connecting AP.

According to a second invention, there is provided a wireless communication system comprising a base station AP of an unlicensed band, a base station IS of a licensed band, a terminal station STA of the unlicensed band, a terminal station UE corresponding to the licensed band and the unlicensed band, and a management server that manages line selection of the unlicensed band/licensed band of the UE and manages parameters of the unlicensed band, in which the management server comprises a control unit excluding the UE that uses the licensed band from an optimization target in an unlicensed band system and optimizing the parameters of the unlicensed band in consideration of existence of the STA and the UE that uses the unlicensed band.

In the wireless communication system according to the second invention, the control unit is configured to adopt a pattern when a total of a communication capacity in the unlicensed band and a communication capacity in the licensed band after the optimization of the parameters of the unlicensed band becomes high for the line selection of the UE, and set the parameters of the unlicensed band after the optimization of the line selection for the AP, the STA, and the UE of the unlicensed band.

In the wireless communication system according to the second invention, the control unit is configured to adjust a transmission power, a reception sensitivity threshold, a frequency, and a frequency width as the parameters of the unlicensed band, and set a parameter that allows a low transmission rate and occurrence of a hidden station problem/exposed station problem for a place where the STA or the UE that uses the unlicensed band does not exist in a service area of the AP.

In the wireless communication system according to the second invention, the control unit is configured to decide selection of the UE that uses the licensed band based on information on the radio wave strength between a connecting AP and the UE, information on the radio wave strength between a neighboring AP of the UE and a neighboring AP of the connecting AP, and information on an amount of communication in the connecting AP, the neighboring AP of the UE, and the neighboring AP of the connecting AP.

According to a third invention, there is provided a management server that manages line selection of an unlicensed band/licensed band of a UE and manages parameters of the unlicensed band of a wireless communication system including a base station AP of the unlicensed band, a base station BS of the licensed band, a terminal station STA of the unlicensed band, a terminal station UE corresponding to the licensed band and the unlicensed band, and the management server, the management server including a control unit excluding the UE that uses the licensed band from an optimization target in an unlicensed band system and optimizing the parameters of the unlicensed band in consideration of existence of the STA and the UE that uses the unlicensed band.

In the management server according to the third invention, the control unit is configured to adopt a pattern when a total of a communication capacity in the unlicensed band and a communication capacity in the licensed band after the optimization of the parameters of the unlicensed band becomes high for line selection of the UE, and set the parameters of the unlicensed band after the optimization of the line selection for the AP, the STA, and the UE of the unlicensed band.

In the management server according to the third invention, the control unit is configured to adjust a transmission power, a reception sensitivity threshold, a frequency, and a frequency width as the parameters of the unlicensed band, and set a parameter that allows a low transmission rate and occurrence of a hidden station problem/exposed station problem for a place where the STA or the UE that uses the unlicensed band does not exist in a service area of the AP.

In the management server according to the third invention, the control unit is configured to decide selection of the UE that uses the licensed band based on information on the radio wave strength between a connecting AP and the UE, information on the radio wave strength between a neighboring AP of the UE and a neighboring AP of the connecting AP, and information on an amount of communication in the connecting AP, the neighboring AP of the UE, and the neighboring AP of the connecting AP.

Effects of the Invention

According to the present invention, in optimization of the parameters of unlicensed band, the parameter can be set while securing a wide coverage area since the number of UEs that use the licensed band can be intentionally reduced. With this configuration, the communication capacity in the unlicensed band and the entire system can be expanded.

Furthermore, it is possible to implement an increase in the transmission opportunity and an increase in the communication frequency width by setting the parameters of the unlicensed band that allows the low transmission rate and the occurrence of the hidden station problem/exposed station problem. With this configuration, the communication capacity in the unlicensed band and the entire system can be expanded.

Furthermore, for UEs that use the licensed band, the number of candidates in the optimization calculation can be reduced since it is possible to make a selection in consideration of a decrease in transmission rate and the occurrence of a hidden station problem/exposed station problem by controlling the parameters of the unlicensed band, and thus.

BEST MODE FOR CARRYING OUT THE INVENTION (Basic Configuration)

Figure 1:
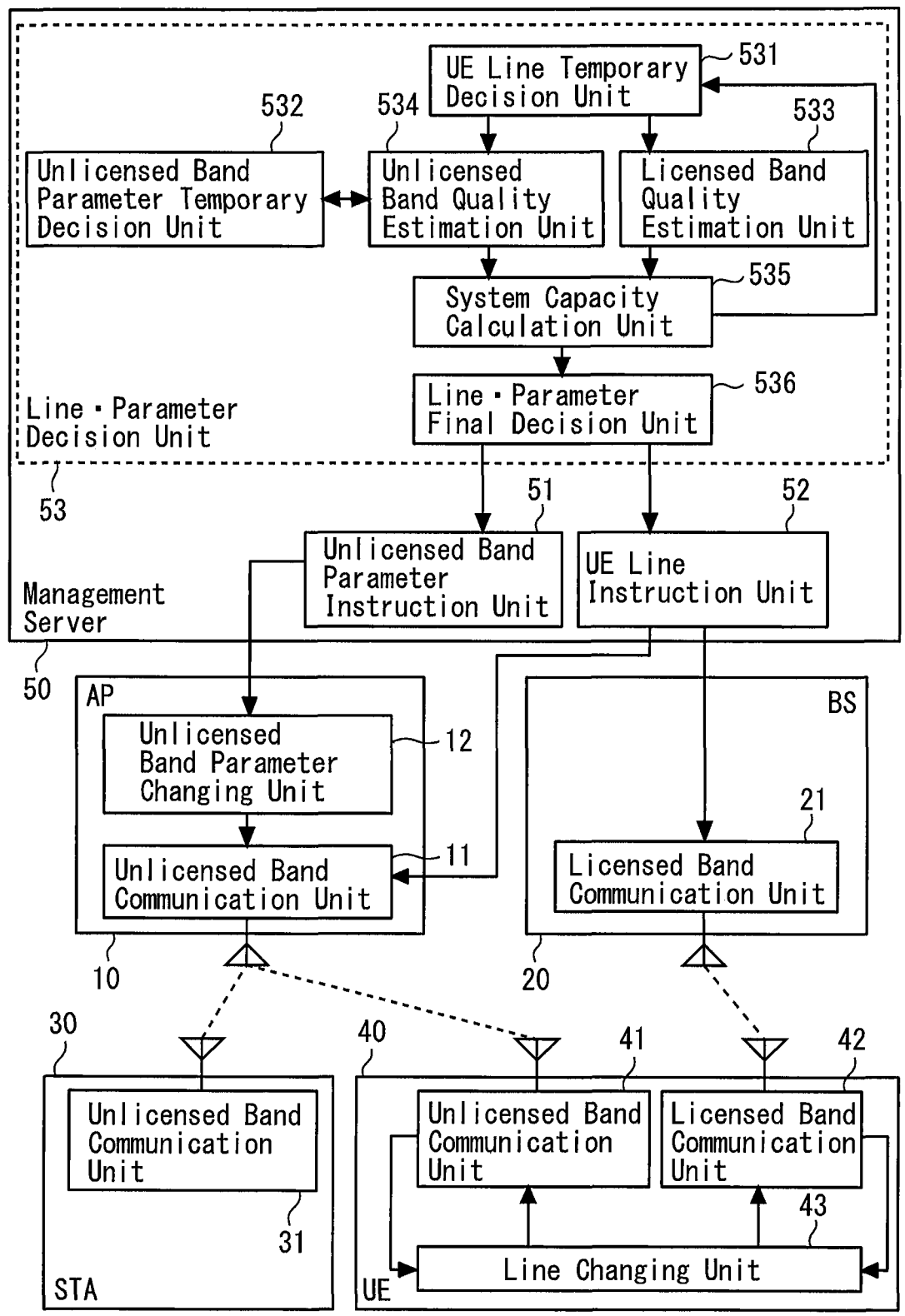
FIG. 1 is a diagram illustrating a basic configuration example of a wireless communication system of the present invention.

FIG. 1 illustrates an example of a basic configuration of a wireless communication system of the present invention. In FIG. 1, a base station (hereinafter referred to as an AP) 10 of unlicensed band includes an unlicensed band communication unit 11 and an unlicensed band parameter changing unit 12. A base station (hereinafter, referred to as BS) 20 of licensed band includes a licensed band communication unit 21. A terminal station (hereinafter, referred to as STA) 30 corresponding to the unlicensed band includes an unlicensed band communication unit 31 and communicates with the AP 10. A terminal station (hereinafter, referred to as UE) 40 corresponding to the unlicensed band and the licensed band includes an unlicensed band communication unit 41, a licensed band communication unit 42, and a line changing unit 43, and communicates with the AP 10 or the BS 20 depending on the selection made by the line changing unit 43.

A management server 50 includes an unlicensed band parameter instruction unit 51, a UE line instruction unit 52, and a line•parameter decision unit 53. The line•parameter decision unit 53 includes a UE line temporary decision unit 531, an unlicensed band parameter temporary decision unit S32, a licensed band quality estimation unit 533, an unlicensed band quality estimation unit 534, a system capacity calculation unit 535, and a line•parameter final decision unit 536.

The unlicensed band parameter instruction unit S1 instructs the unlicensed band parameter changing unit 12 of the AP 10 about the unlicensed band parameter. The unlicensed band parameter changing unit 12 of the AP 10 changes the unlicensed band parameter for itself based on the unlicensed band parameter instructed by the management server 50.

The UE line instruction unit 52 instructs the unlicensed band communication unit 11 of the AP 10 and the licensed band communication unit 21 of the BS 20 about a use line of the UE 40. The line changing unit 43 of the UE 40 receives the use line instructed by the management server 50 from the unlicensed band communication unit 41 via the AP 10 or receives the use line from the licensed band communication unit 42 via the BS 20, and selects the use line based on the instruction.

The line•parameter decision unit 53 of the management server 50 decides the unlicensed band parameter of the AP 10 and the use line of the UE 40 as follows.

First, the UE line temporary decision unit 531 temporarily decides a licensed band or an unlicensed band as a line used by a flow of the UE 40. Here, the flow is a unit with which the STA 30 and the UE 40 communicate. For example, when the UE 40 executes two applications of voice communication and video streaming, the voice communication and the video streaming are each one flow. It should be noted that when the line selection cannot be made for each flow and only the licensed band or the unlicensed band can be selected for all the flows at once in the UE 40, the same line is selected for all the flows in the UE 40. All the flows of the STA 30 use the unlicensed band.

The licensed band quality estimation unit 533 estimates a communication quality of each flow in the licensed band and a communication capacity in the entire licensed band from information of the flow for which the use of the licensed band is temporarily decided.

The unlicensed band quality estimation unit 534 determines that the flow for which the use of the licensed band has been temporarily decided does not use the unlicensed band, the unlicensed band parameter temporary decision unit 532 temporarily decides the transmission power, reception sensitivity threshold, frequency and frequency width as parameters, and the communication quality of each flow in the unlicensed band and the communication capacity in the entire unlicensed band in the parameters after the temporal decision are estimated. It is noted that the reception sensitivity threshold may be a carrier sense threshold. This temporary decision of parameters is performed in the unlicensed band quality estimation unit 534 so that the communication capacity in the entire unlicensed band is maximized while satisfying a required quality of each flow.

The system capacity calculation unit 535 calculates the total communication capacity in the licensed band and the unlicensed band, that is, the system capacity, based on the respective communication capacities estimated by the licensed band quality estimation unit 533 and the unlicensed band quality estimation unit 534.

The communication quality and required quality referred to here may be any form regarding communication quality such as throughput, delay and jitter, and may be a combination thereof. For example, when performing voice communication, there are demands for delay and jitter as the communication quality. When performing video streaming, there is a demand for throughput as the communication quality.

As a method of determining the communication quality of the flow, for example, the AP 10 and the BS 20 directly obtain information of an application used by the STA 30 and the UE 40 from respective flow information notification units of the STA 30 and the UE 40, and a flow information reception unit of the management server 50 collects the information to determine the communication quality of the flow. It is noted that the flow information notification units and the flow information reception unit are not illustrated. Alternatively, the AP 10 includes a STA/UE communication history acquisition unit, the BS 20 includes a UE communication history acquisition unit, and a communication history information reception unit of the management server 50 collects a data transmission/reception pattern in each communication history to determine the communication quality of the flow. It is noted that the STA/UE communication history acquisition unit, the UE communication history acquisition unit, and the communication history information reception unit are not illustrated. Alternatively, the determination may be made on the network side using a method such as deep packet inspection. From information on the determined communication quality of the flows, the required quality of the flows is obtained. For example, if it is the flow of video streaming, there is a required quality, which is the minimum throughput capable of allowing video to be played back without interruption.

Besides, the maximum throughput that can be implemented when the wireless access line is not at a throughput bottleneck is estimated. For example, if it is a flow of video streaming, the maximum throughput is determined by the size of the video, and if it is a flow for downloading data, the maximum throughput becomes large as long as the server that holds data, the network on the upper level side of the wireless access line, and the communication protocol permit. It is noted that, when it is difficult to estimate the maximum throughput because the upper limit varies, the maximum throughput can be narrowed down by a method such as setting an upper limit on the communication speed of each flow at the network side, AP, or STA/UE to facilitate the estimation, alternatively a statistical value such as an average value may be used. For a system that does not have a method of determining the communication quality of a flow, an uniform required quality for the UE or STA, or the maximum throughput that can be implemented by the UE or STA may be assumed.

The line temporary decision by the UE line temporary decision unit 531 is performed so as to maximize the system capacity while satisfying the required quality of each flow. When there is a flow that does not satisfy the required quality in the unlicensed band no matter what parameter is changed, the corresponding line temporary decision is not adopted. In addition, when there is a flow that does not satisfy the required quality in the licensed band, the corresponding line temporary decision is not adopted.

the line•parameter final decision unit 536 decides the unlicensed band parameter of the AP 10 and the use line of each flow of the UE 40 based on the contents of the UE line temporary decision and the unlicensed band parameter temporary decision that maximize the system capacity through the procedure as described above.

It is noted that the lines and parameters that can be selected for the line temporary decision by the UE line temporary decision unit 531 and the parameter temporary decision by the unlicensed band parameter temporary decision unit 532 have a range that can be taken by each UE 40 as well as the AP 10, STA 30 and UE 40 in the unlicensed band, and thus if the calculation is completed within capability of the computer and the time allowed for the calculation, an optimum value for all combinations is calculated. An example of the procedure is illustrated in FIG. 3.

Figure 3:
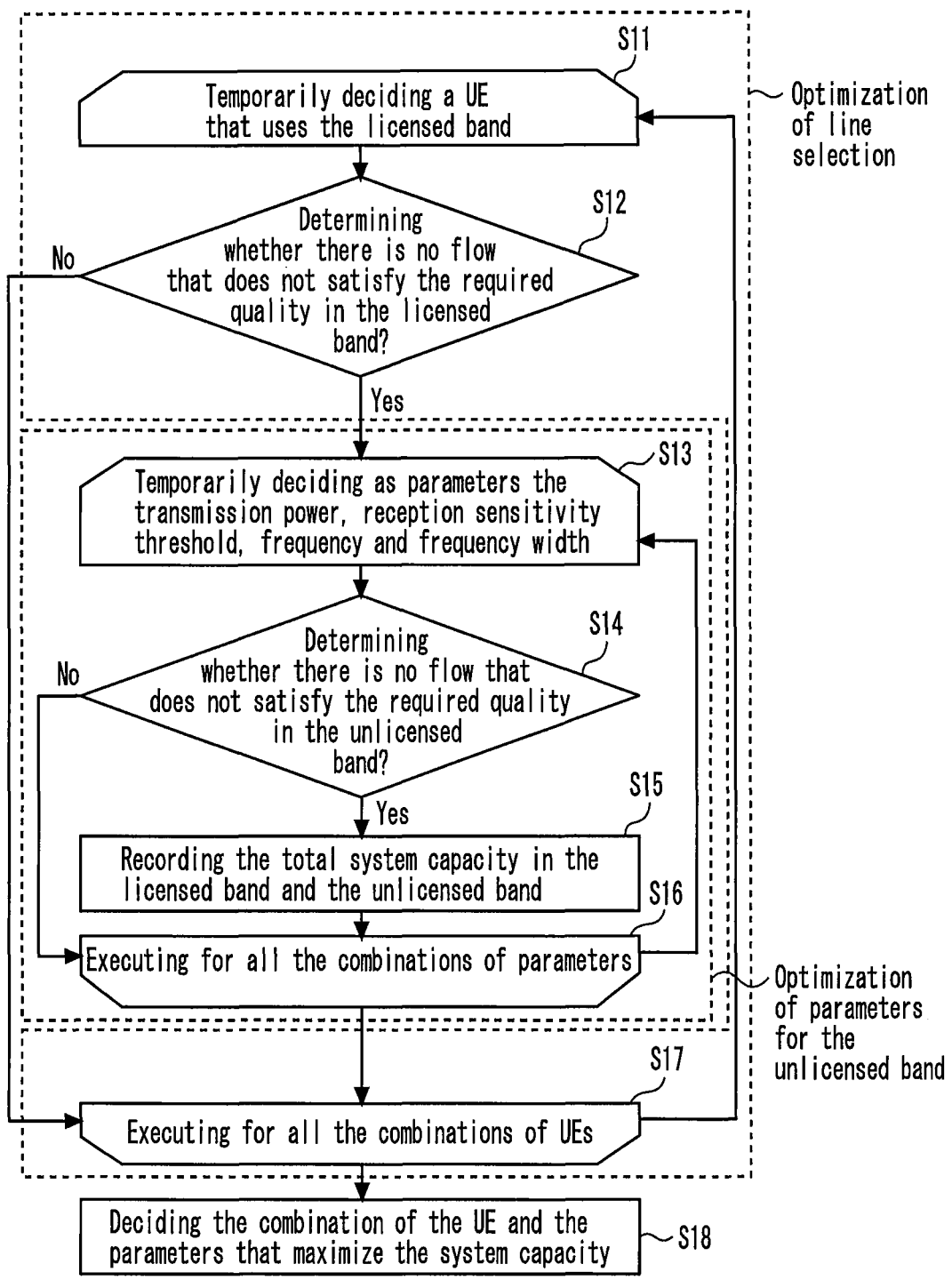
FIG. 3 is a flowchart illustrating a processing procedure example 1 for optimizing line selection and unlicensed band parameters.

In FIG. 3, as a line selection optimization, a UE that uses the licensed band is temporarily decided (S1), and it is determined that there is no flow that does not satisfy the required quality in the licensed band (S12). For the temporarily decided UE, when there is no flow that does not satisfy the required quality in the licensed band (S12: Yes), the parameter optimization of the unlicensed band is performed, and the transmission power, reception sensitivity threshold, frequency and frequency width are temporarily decided as parameters (S13). Next, it is determined that there is no flow that does not satisfy the required quality in the unlicensed band (S14). When there is no flow (S14: Yes), the total system capacity in the licensed band and the unlicensed band is recorded (S15). Furthermore, processing from step S13 is repeated for all the combinations of parameters (S16). Furthermore, processing from step S11 is repeated for all the combinations of UEs (17), and the UE using the licensed band and the parameters of the unlicensed band that maximize the system capacity are decided (S18).

It is noted that, if the number of combinations is large and there is a problem in the capability of the computer and the calculation time, the Monte Carlo method may be used or an optimization algorithm such as a genetic algorithm may be used.

Communication quality estimation in the unlicensed band quality estimation unit 534 includes methods such as calculation using a simulator, calculation by an analytic function using a Markov chain, calculation using a graph theory, and calculation by a function derived from experience and learning can be used.

(Another Configuration Example of Line •Parameter Decision Unit 53 of Management Server 50)

Figure 2:
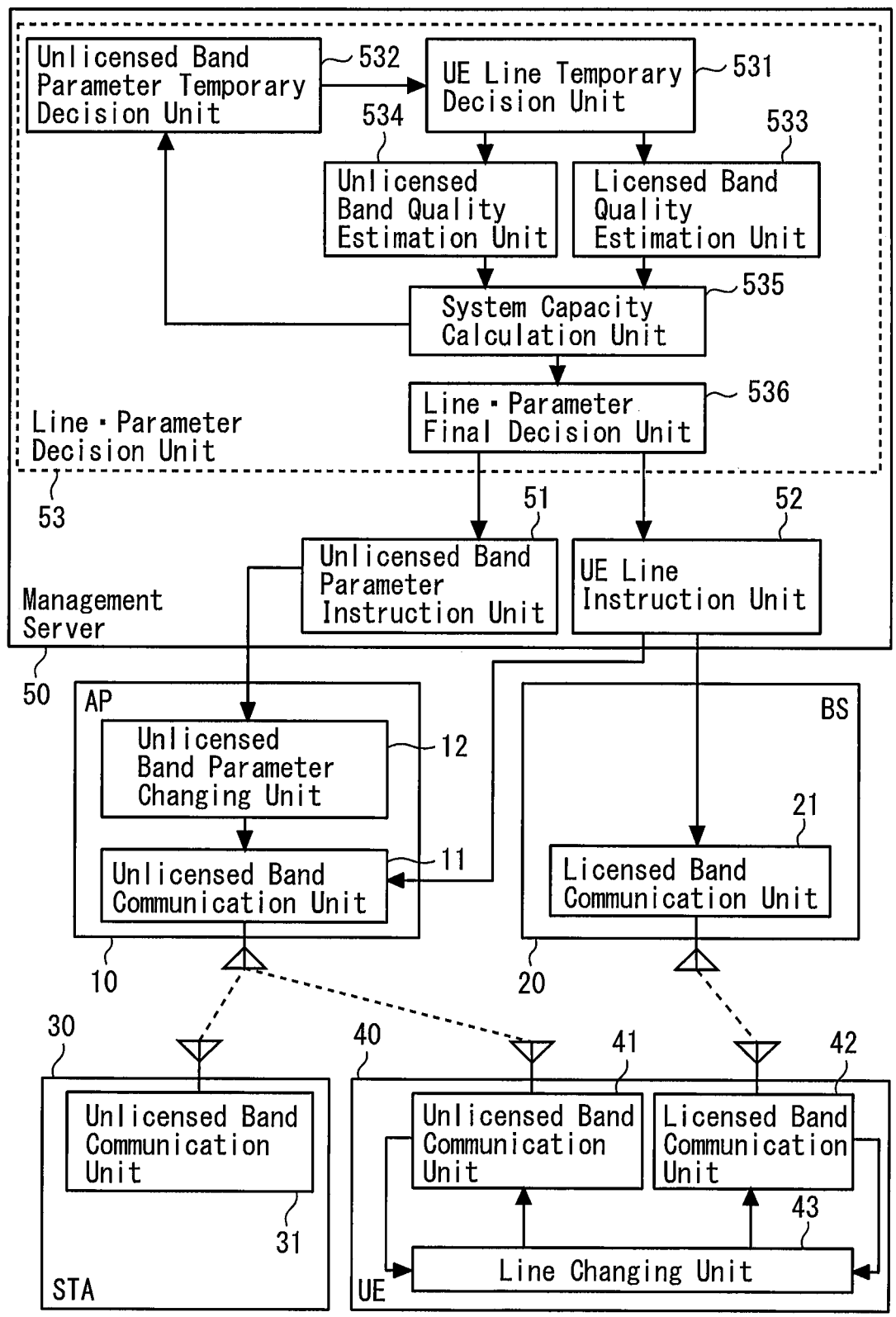
FIG. 2 is a diagram illustrating another configuration example of a line•parameter decision unit 53.
Figure 4:
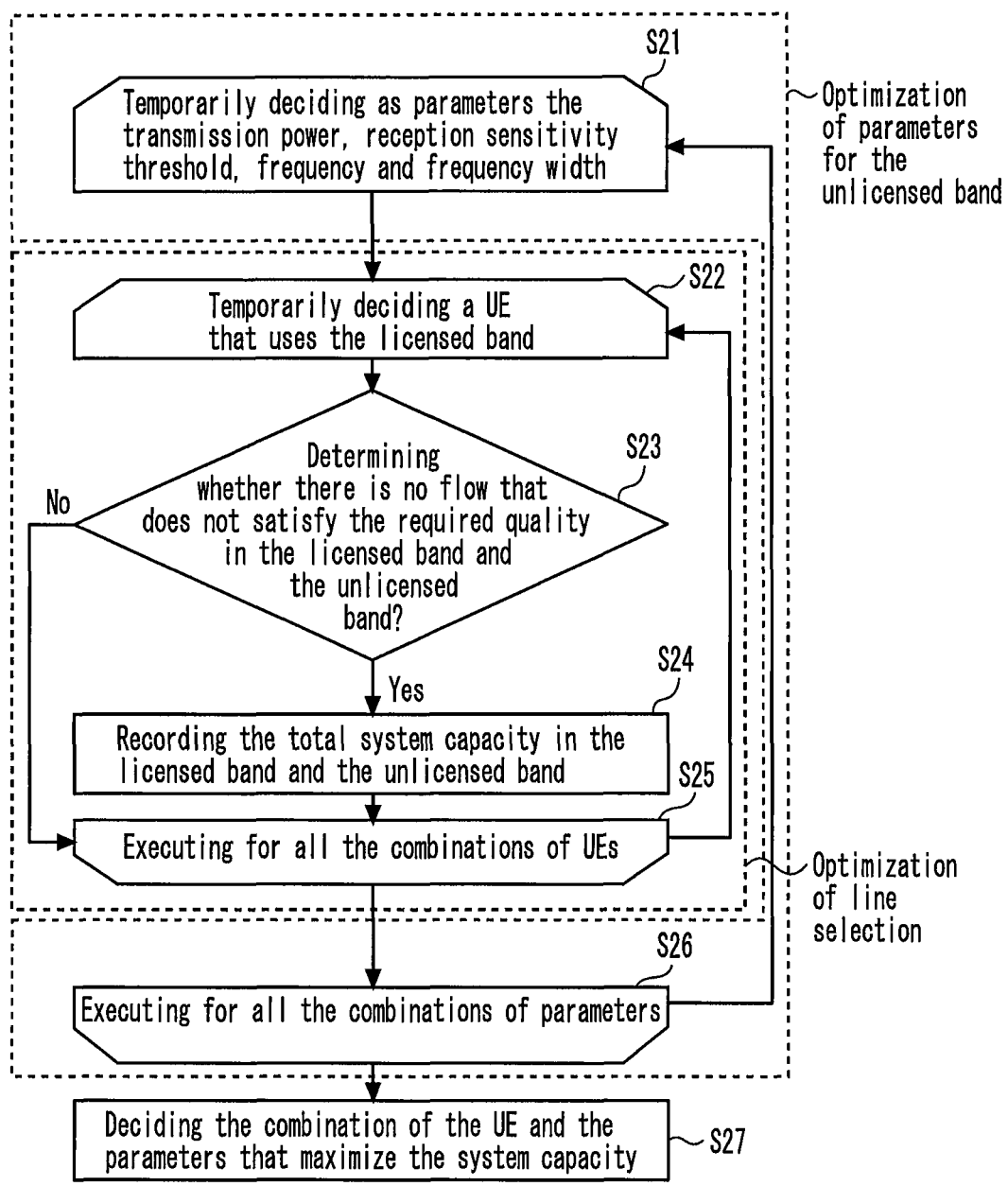
FIG. 4 is a flowchart illustrating a processing procedure example 2 for optimizing line selection and unlicensed band parameters.

FIG. 2 illustrates another configuration example of the line•parameter decision unit 53. In FIG. 2, in the line•parameter decision unit 53, the order of the line selection optimization and the optimization of the unlicensed band parameter in the basic configuration of FIG. 1 is reversed, and the unlicensed band parameter temporary decision unit 532 is arranged in front of the UE line temporary decision unit 531. FIG. 4 illustrates a processing procedure after the parameter temporary decision by the unlicensed band parameter temporary decision unit 532 and the line temporary decision by the UE line temporary decision unit 531.

In FIG. 4, as the parameter optimization of the unlicensed band, the transmission power, reception sensitivity threshold, frequency and frequency width are temporarily decided as parameters (S21). Next, as the line selection optimization, the UE that uses the licensed band is temporarily decided (S22), and it is determined that there is no flow that does not satisfy the required quality in the licensed band and the unlicensed band (S23). When there is no flow that does not satisfy the required quality in the licensed band and the unlicensed band for the temporarily decided UE (S23: Yes), the total system capacity of the licensed band and the unlicensed band is recorded (S24). Furthermore, processing from step S22 is repeated for all the combinations of UEs (S25), and processing from step S21 is repeated for all the combinations of parameters (S26), and the UE that uses the licensed band and the parameters of the unlicensed band that maximize the system capacity are decided (S27).

(Configuration Example for Communication Quality Estimation of Licensed Band Quality Estimation Unit 533)

Regarding the configuration example for the communication quality estimation in the licensed band quality estimation unit 533 of the line•parameter decision unit 53 of the management server 50, the following two examples will be described.

Figure 5:
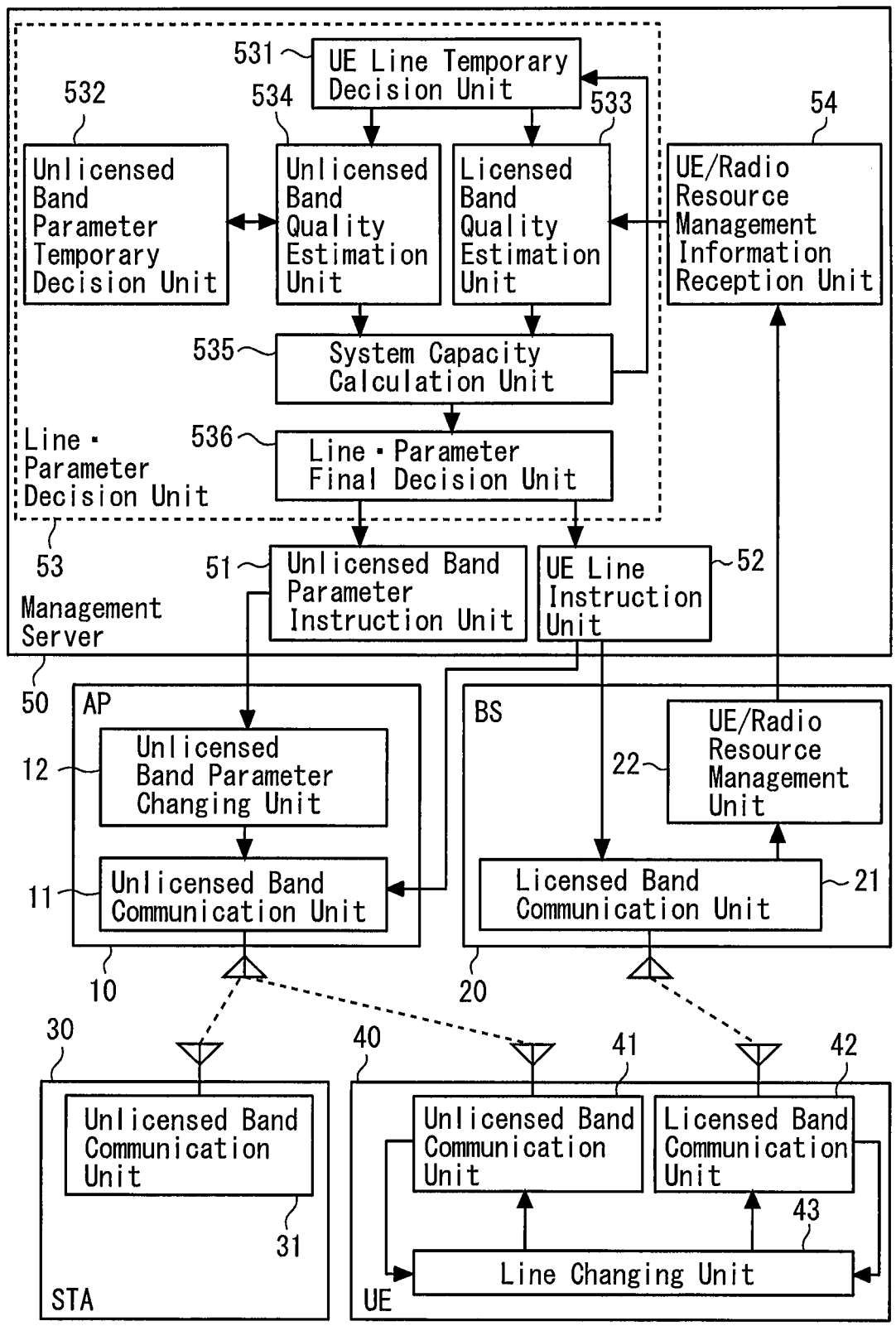
FIG. 5 is a diagram illustrating a configuration example 1 for communication quality estimation of a licensed band quality estimation unit 533.

FIG. 5 illustrates a configuration example 1 for communication quality estimation of the licensed band quality estimation unit 533. Here, an example of collecting information from the BS 20 is illustrated.

In FIG. 5, the AP 10, the BS 20, the STA 30, the UE 40, and the management server 50 have the same basic configuration as illustrated in FIG. 1. Here, in the communication of the licensed band, the radio resources allocated to the UE 40 are managed by a UE/radio resource management unit 22 of the BS 20 or a base station management device. Accordingly, a UE/radio resource management information reception unit 54 of the management server 50 communicates with the UE/radio resource management unit 22 of the BS 20 or the base station management device and acquires information of the UE 40 and information on radio resource management, thereby estimating the communication quality when the licensed band of each UE is used and making notification to the licensed band quality estimation unit 533.

Figure 6:
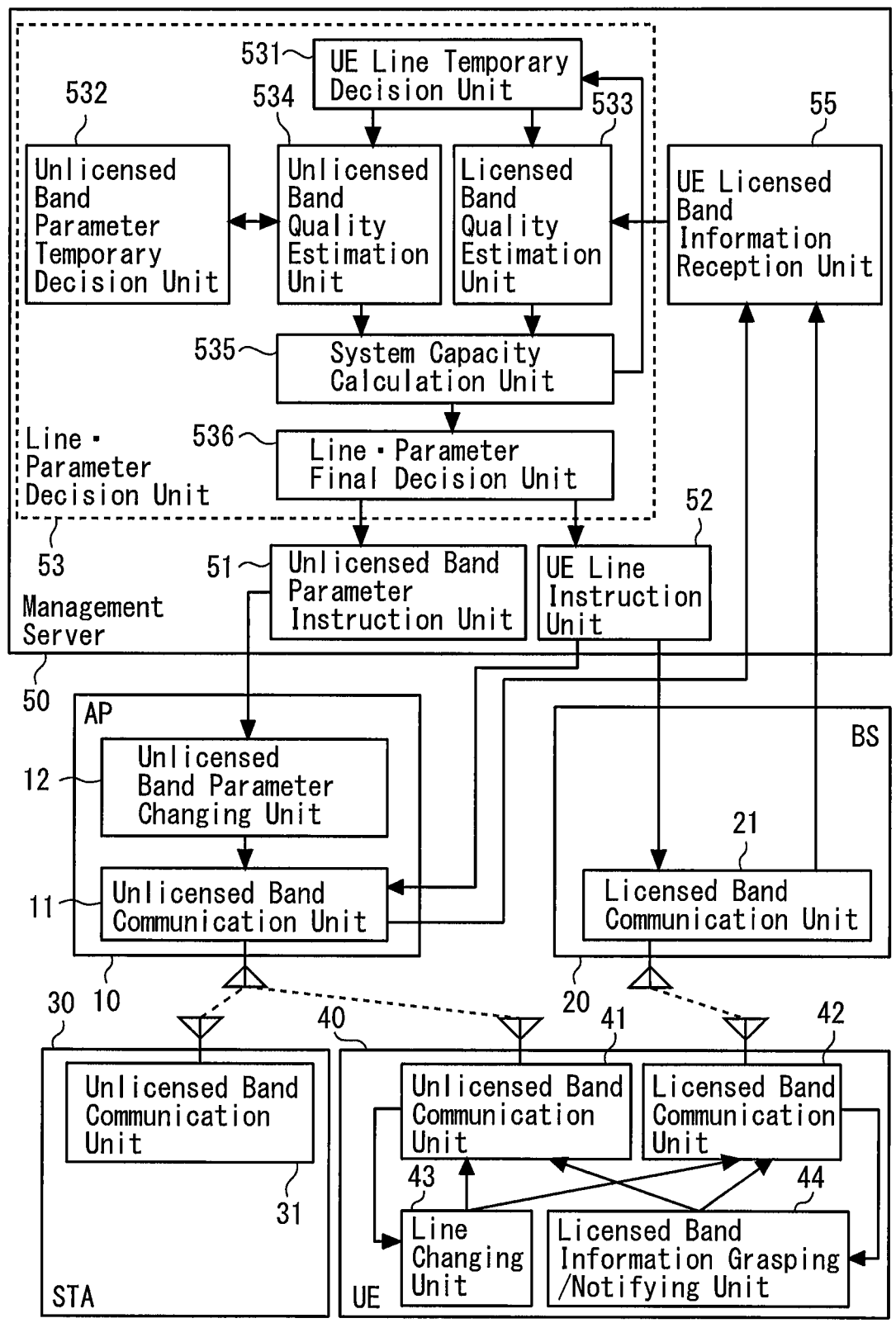
FIG. 6 is a diagram illustrating a configuration example 2 for communication quality estimation of the licensed band quality estimation unit 533.

FIG. 6 illustrates a configuration example 2 for the communication quality estimation of the licensed band quality estimation unit 533. Here, an example of collecting licensed band information from the UE 40 is illustrated.

In FIG. 6, the AP 10, the BS 20, the STA 30, the UE 40, and the management server 50 have the same basic configuration as illustrated in FIG. 1. Here, a licensed band information acquiring/notifying unit 44 of the UE 40 has acquired information of the BS 20 that is connected to or can be connected to the licensed band information grasping/notifying unit 44, and information on radio wave quality with the BS 20. Accordingly, a UE licensed band information reception unit 55 of the management server 50 collects these pieces of information via the AP 10 or the BS 20 to estimate the communication quality, and makes notification to the licensed band quality estimation unit 533.

Incidentally, it can be assumed that the licensed band is easier to grasp the communication quality compared to the unlicensed band and the hidden station problem/exposed station problem does not occur because the licensed band is decided to be installed by station placement design and does not have an uncontrolled interference source outside the management or is managed separately. Although communication in the licensed band using a high radio frequency may not be stable due to the effect of radio wave attenuation due to a shield or the like, it is expected that the communication service in the licensed band is operated separately in combination with a stable licensed band that uses a low frequency, and thus the communication quality is assumed to be stable. Furthermore, in the licensed band, since the radio resources allocated to the UEs are managed, it is possible to ignore changes in the communication quality given to other neighboring UEs by the radio wave strength in each UE. Accordingly, grasping the capabilities of the licensed band base station and the UE, grasping the number of connected UEs in the base station and their flows, and grasping the radio wave strength between each UE and the base station can be substituted for the communication quality in the licensed band.

On the other hand, when the UE whose information is not known in the management server exists in the service area of the unlicensed band, or the UE exists outside the service area of the unlicensed band and within the service area of the licensed band under a situation where the service areas of the licensed band and the unlicensed band do not match, the information on the number of connected UEs and their flows is insufficient for the management server, since the communication in the licensed band by the UE whose information is not known in the management server cannot be taken into consideration. In these cases, the number of UEs that exist in the service area of the unlicensed band but whose information does not exist in the management server, or the number of UEs that exist outside the service area of the unlicensed band and within the service area of the licensed band may be statistically grasped in advance with respect to the number of UEs whose information exists in the management server, and the ratio thereof may be obtained. Then, the number of licensed band UEs whose information does not exist in the management server and their flows may be estimated from the information on the licensed band UEs whose information currently exists in the management server. Further, a method of supplementing only the lacking information by collecting information from the licensed band base station or base station management device may be adopted.

In the management server, the number of flows that can be allowed in the licensed band or the communication capacity according to the flows are decided in advance for the UE whose information exists in the management server, in order to simplify management regarding the UE whose information does not exist in the management server or the mismatch between the service areas of the licensed band and the unlicensed band. Then, the UE line selection may be performed within the range thereof, and the communication quality estimation in the licensed band quality estimation unit 533 may be performed based on the number of allowable flows and information on the communication capacity according to the flows.

It is noted that, in the UE line selection, the line is selected from a list of lines that can be selected by the UE. The unlicensed band parameter is determined by collecting information on the capabilities in the unlicensed band of the AP, STA and UE from the AP, STA and UE. For the quality estimation of the unlicensed band, quality estimation is performed by collecting information on the flow of each STA or UE that uses the unlicensed band, the list of neighboring APs at the AP and the radio wave strength between the APs, the radio wave strength between the connected AP and the STA or UE, the list of neighboring APs at the STA or UE and the radio wave strength between the APs and the STA or UE. However, these are only examples, and it is possible to substitute with statistical information or other information, and add information that improves estimation accuracy.

In the present invention, since it is based on the premise that the AP can be managed by the management server, it is assumed that the information on the unlicensed band of the AP and the information on the capability of the STA or UE connected thereto can be collected. For the STA or UE, since it is based on the premise that information on the unlicensed band of the STA or UE can be acquired by acquisition instruction of information on the radio wave strength between the list of neighboring APs and the AP by the AP and the UE can be managed by the management server, it is assumed that the information can also be acquired by an instruction from the management server.

When using the method of the following example, it is possible to reduce the number of combinations in optimization and shorten the calculation time.

(Example of Narrowing Down UE Line Temporary Decision)

Figure 14:
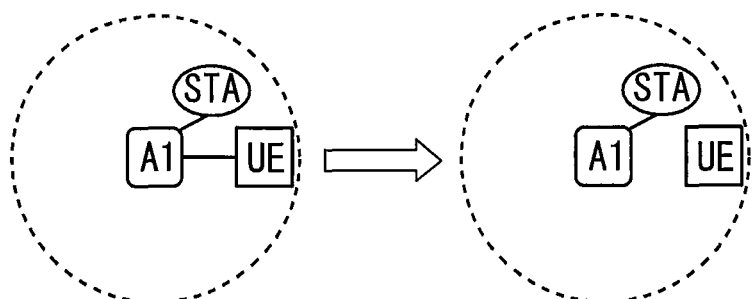
FIG. 14 is a diagram illustrating methods 1 to 4 of increasing a communication capacity of an entire system.
Figure 14:
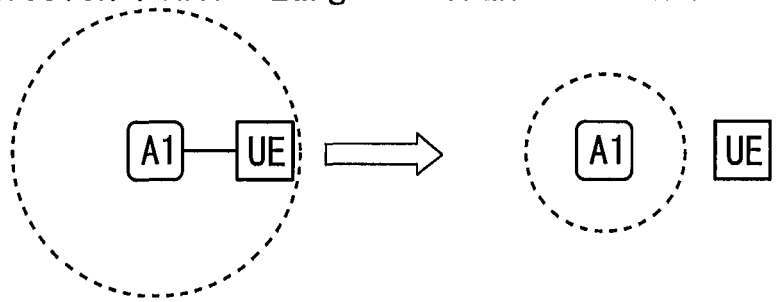
Figure 14:
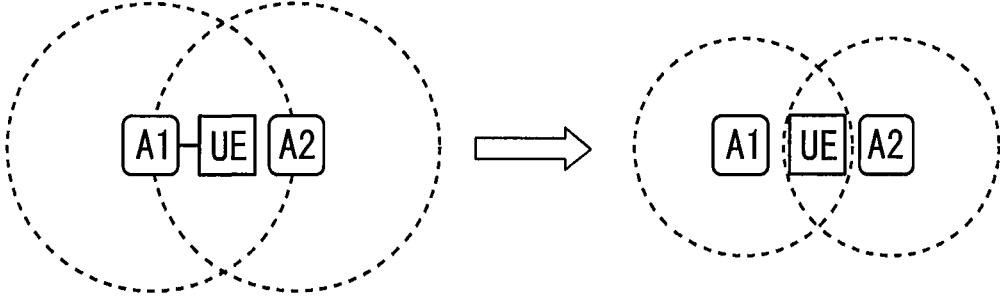
Figure 14:
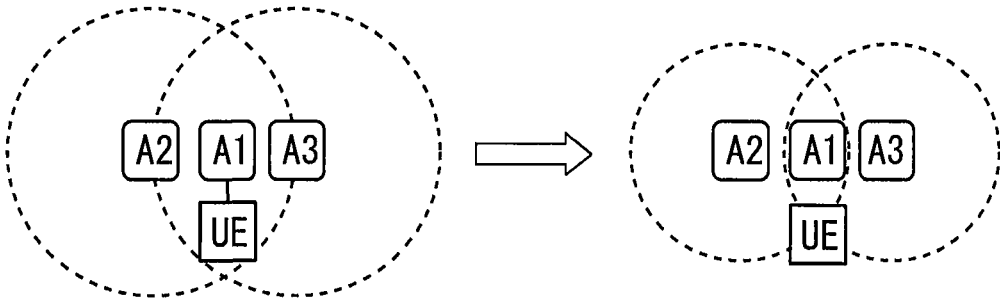
Figure 15:
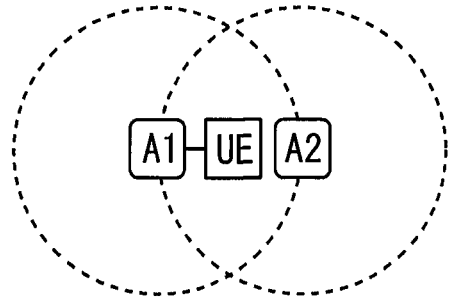
FIG. 15 is a diagram illustrating methods 5 to 8 of increasing the communication capacity of the entire system.
Figure 15:
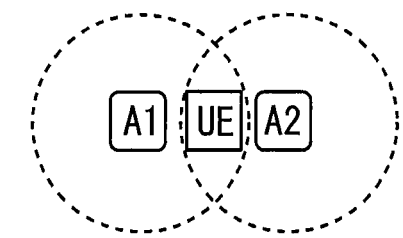
Figure 15:
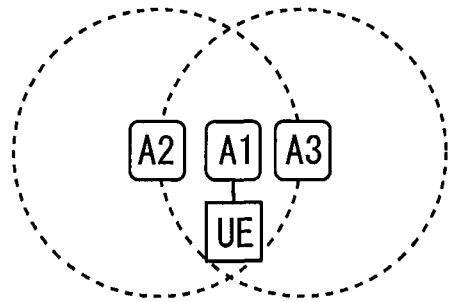
Figure 15:
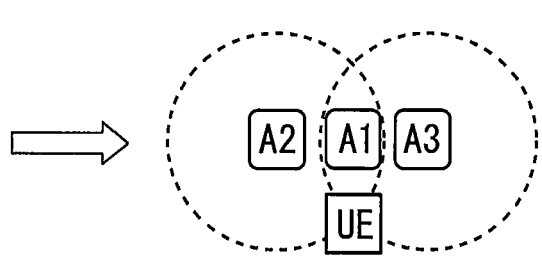
Figure 15:
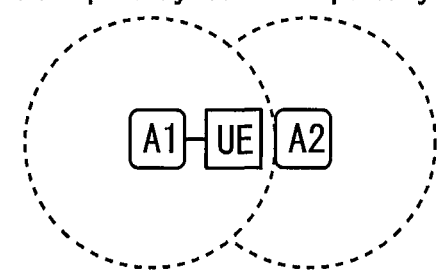
Figure 15:
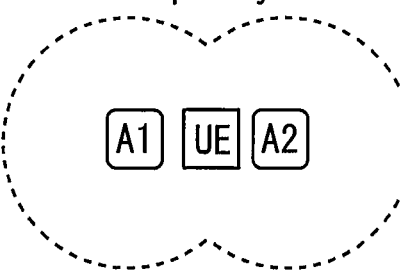
Figure 15:
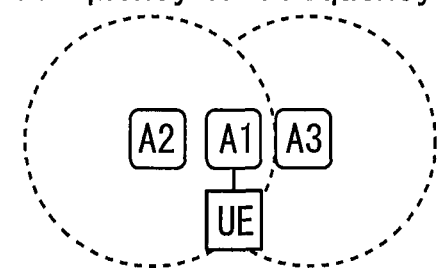
Figure 15:
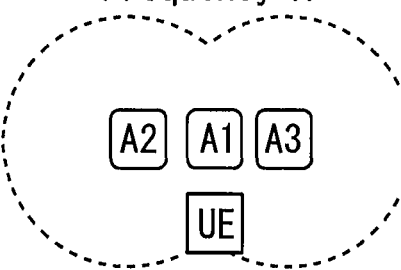

Here, a case is illustrated in which information on the radio wave strength between the connecting AP and the corresponding UE is used. Probabilistically, as the radio wave strength between the AP and the UE is higher, a transmission rate between the AP and the UE can be made higher, and the hidden station problem/exposed station problem is less likely to occur. On the other hand, when a licensed band is used by a UE having a low radio wave strength between the AP and the UE, as illustrated in FIGS. 14 and 15, there is a high probability that an increase in communication capacity can be expected and a high probability that the required quality of the flow can be satisfied.

Accordingly, by selecting which one of the unlicensed band and the licensed band is to be used based on the radio wave strength from the AP at the UE or the radio wave strength from the UE at the AP, it is possible to narrow down the combination of UE line temporary decisions.

Figure 7:
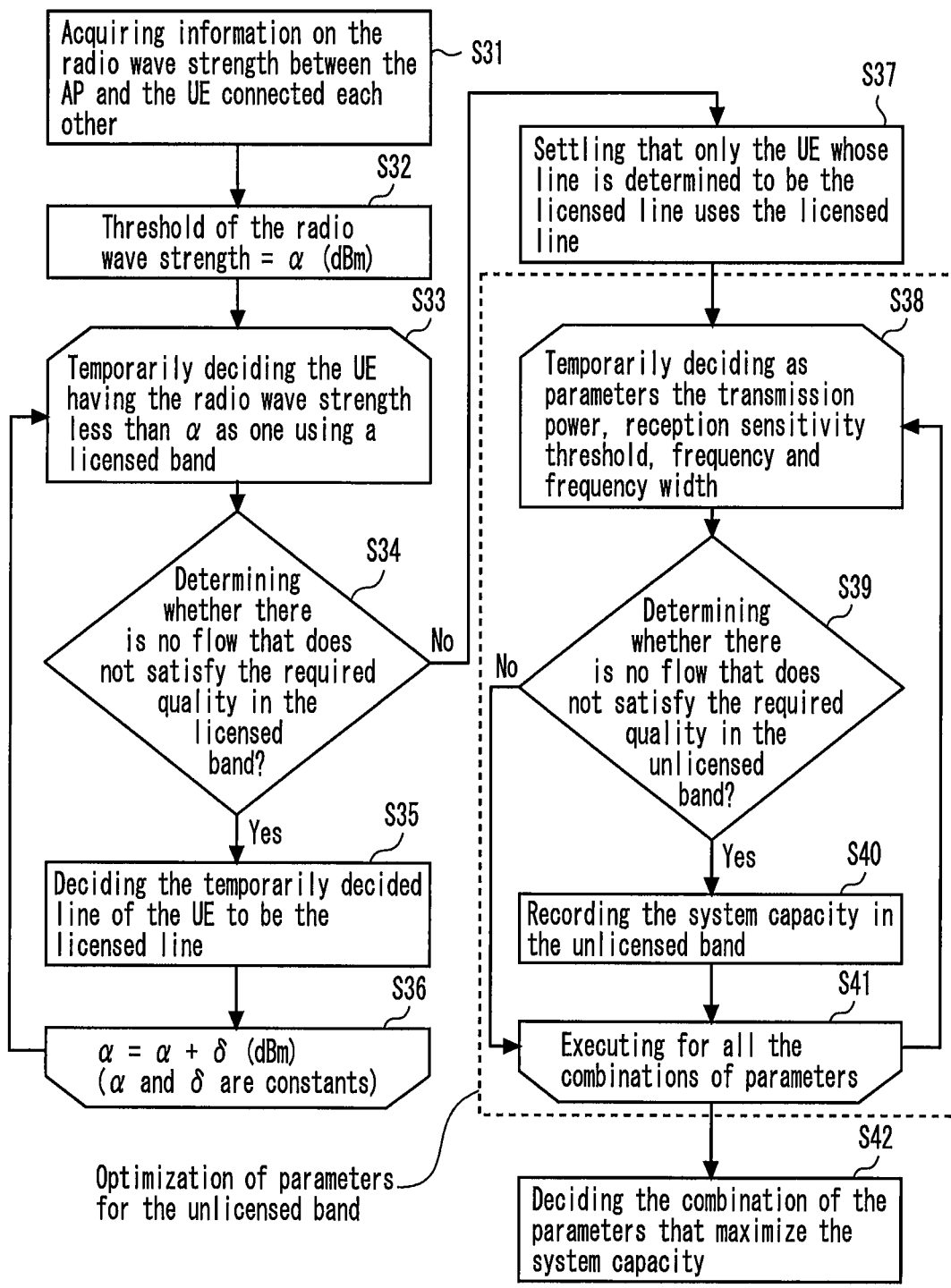
FIG. 7 is a flowchart illustrating a procedure example 1 for narrowing down UE line temporary decision.

FIG. 7 illustrates a procedure example 1 of narrowing down the UE line temporary decision, in FIG. 7, the UE line temporary decision unit 531 of the management server 50 acquires information on the radio wave strength between the connecting AP and the UE (S31), sets a threshold of the radio wave strength as α (dBm) (S32), temporarily decides the UE having the radio wave strength less than α as licensed band use (S33), and estimates the communication quality of the flow for which the licensed band use is selected based on the threshold α (S34). The threshold α of the radio wave strength for line selection is changed to calculate the system capacity, and under the condition that there is no flow that does not satisfy the required quality (does not exceed the upper limit of communication capacity), the threshold of the radio wave strength for line selection is decided by the threshold with the largest system capacity (S35, S36, and S37). For the flow for which use of the unlicensed band is selected, while the unlicensed band quality estimation unit 534 performs the communication quality estimation, the unlicensed band parameter temporary decision unit 532 temporarily decides the optimum parameter (S38 to S42). In this method, when a threshold is set for the radio wave strength from the AP in the UE, if the threshold is notified to the UE, the UE itself can determine the line selection.

Figure 8:
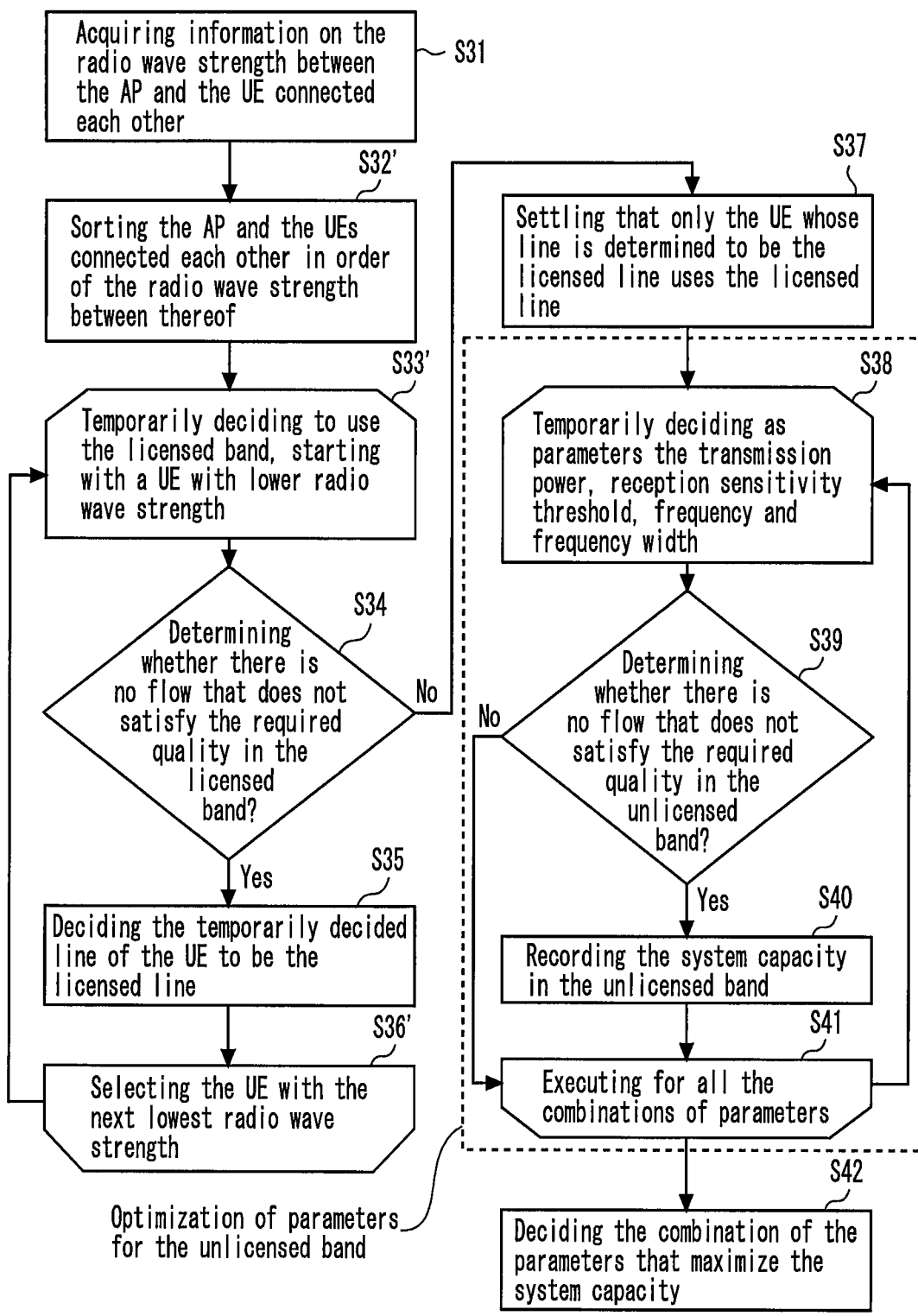
FIG. 8 is a flowchart illustrating a procedure example 2 for narrowing down the UE line temporary decision.

FIG. 8 illustrates a procedure example 2 of narrowing down the UE line temporary decision. In FIG. 8, the UE line temporary decision unit 531 of the management server 50 acquires information on the radio wave strength between the connecting AP and the UE (S31), temporarily decides the use of the licensed band, starting with a flow of a UE with lower radio wave strength (S32' to S36'), and performs the communication quality estimation of the flow for which the use of the licensed band is temporarily decided. The quality estimation in the unlicensed band and the parameter temporary decision (S38 to S42) are the same as those in the narrowing down procedure example 1 of FIG. 7. In this case, on the condition that there is no flow that does not satisfy the required quality, the decision is made using the pattern of line selection having the largest system capacity. Since this method is a method of sequentially increasing the number of flows that use the licensed band, for example, when the number of allowable flows in the licensed band and the upper limit of the communication capacity according to the flows are determined, the range of temporary decision of the licensed band for the flow in the UE can be narrowed down in advance on condition that the range falls within the upper limit.

Incidentally, when the radio wave strength is used as the threshold or when the radio wave strength is selected in ascending order, if the control for lowering the transmission power is performed, there is a concern that the radio wave strength decreases after the control and falls below the threshold, or the order of the radio wave strength is changed, and the control does not converge. There is a case where a high transmission power can be set as the capability of the AP or the UE, and the radio wave strength of the UE or the AP can be increased. When the threshold determination or the order determination is performed, it is possible to cope with this case by devising that an amount of the transmission power being changed by the control is corrected and the determination is performed based on the transmission power before the change. As a signal for monitoring the radio wave strength, there is no problem even with a countermeasure such as using a signal whose transmission power is not changed by control. As a specific example, when the transmission power of the beacon signal that the AP periodically transmits is not changed, there is no problem if the beacon signal is monitored.

Figure 9:
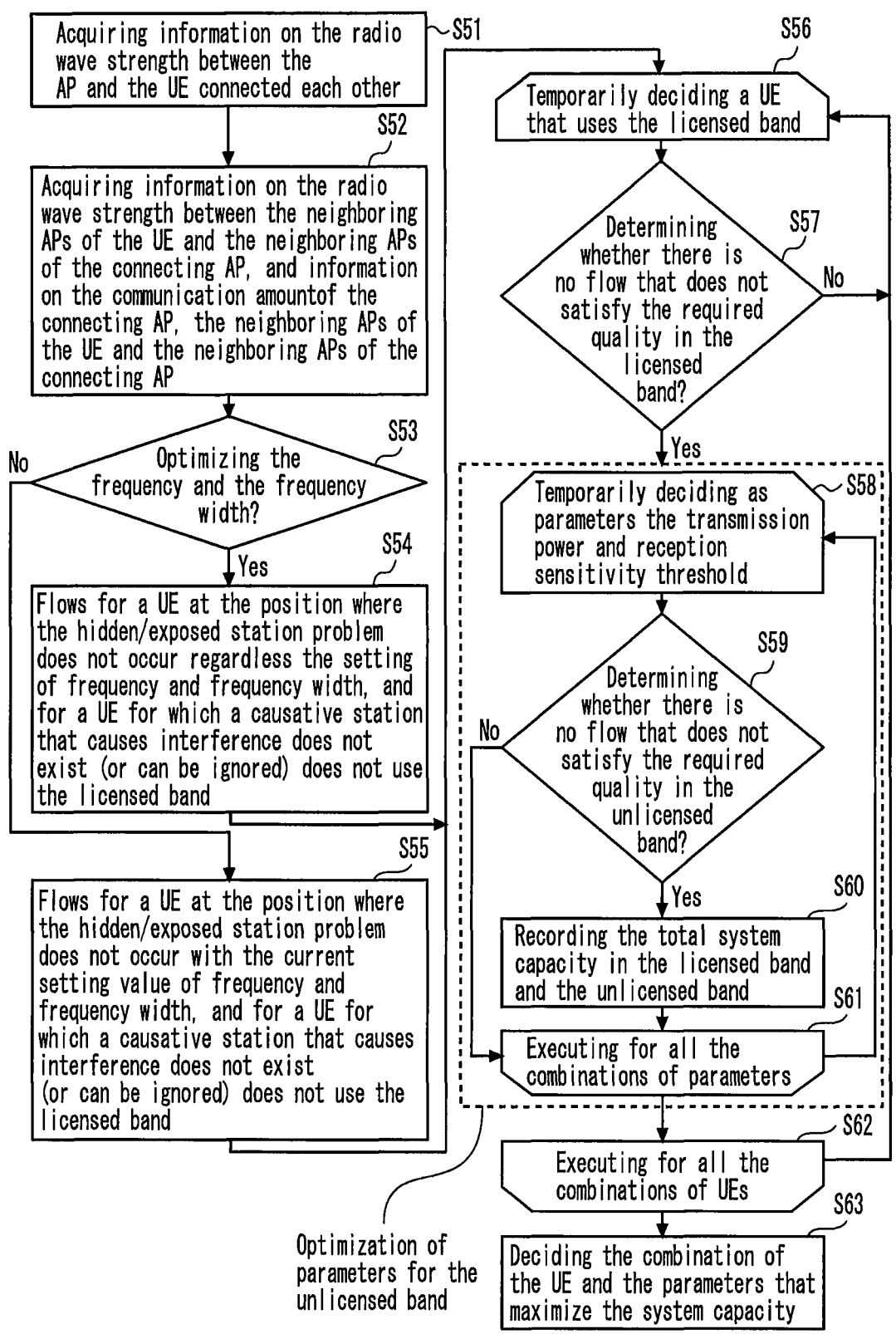
FIG. 9 is a flowchart illustrating a procedure example 3 for narrowing down the UE line temporary decision.

FIG. 9 illustrates a procedure example 3 of narrowing down the UE line temporary decision. In FIG. 9, information on the radio wave strength between the connecting AP and the UE is acquired (S51), and information on the radio wave strength between the neighboring AP of the UE and the neighboring AP of the connecting AP, and information on the communication amount of the connecting AP and the neighboring AP of the UE and the neighboring APs of the connecting AP are acquired (S52). Here, when a plurality of UEs having a similar radio wave strength between the connecting AP and the UE exist, the hidden station problem/exposed station problem does not similarly occurs or the SINR does not always become the same in those UEs. Actually, the occurrence of the hidden station problem/exposed station problem and the SINR differ depending on the relationship with a wireless station (hereinafter, referred to as a causative station) that causes the hidden station problem/exposed station problem and the SINR decrease in each UE and the relationship between the connecting AP and those causative stations.

Incidentally, not only the AP but also the STA or UE can be the causative station. In this case, by grasping the relationships between the AP-AP, between the AP-UE, between the STA-UE, and between the UE-UE, it becomes possible to accurately estimate the occurrence of the hidden station problem/exposed station problem and the SINR. However, in an environment in which the downlink communication directing from the AP to the STA or UE is dominant and a system in which strength of the radio wave transmitted by the STA or UE is lower than that of the AP and the uplink communication from the STA or UE is managed by the AP, that is, the STA or UE performs the uplink communication according to a polling/trigger frame from the AP, the influence is limited even without grasping the relationships between the STA-UE and between the UE-UE. Accordingly, the optimization can be performed only with the information between the AP-AP and between the AP-UE. The AP with little or no communication amount may be excluded from the neighboring APs because even if the AP is the causative station, the transmission of radio waves is small.

Here, when the optimization of the frequency and frequency width is performed, the following processing is performed regardless of the frequency and frequency width setting, and when the optimization is not performed, the following processing is performed using the current setting value of the frequency and frequency width. For a UE at the position where the hidden station problem/exposed station problem does not occur, and a UE for which a causative station that causes interference intensity I in the SINR does not exist or of which interference is small and can be ignored, even if the unlicensed band is used, a problem does not occur in communication quality, and thus the waste of radio resources due to retransmission and packet loss can be ignored. Accordingly, for the UE described above, by excluding the flow that cannot satisfy the communication quality only in the licensed band and fixing the line selection to the unlicensed band by not selecting the licensed band, the range of temporary decision of the licensed band of the flow in the UE can be narrowed down in advance (S53, S54, and S55).

As described above, processing of steps S56 to S63 after the UE that uses the licensed band is temporarily decided is the same as the processing procedure of S11 to S18 illustrated in FIG. 3, except for step S58 for temporarily deciding the transmission power and reception sensitivity threshold as the unlicensed band parameters.

(Example of Narrowing Down Temporary Decision of Unlicensed Band Parameters)

(1) Transmission Power and Reception Sensitivity Threshold

As the transmission power is lowered, the interference intensity I given to other wireless stations may be reduced, or the opportunity to become idle by carrier sensing in other wireless stations may increase. As the reception sensitivity threshold value is increased, the opportunity to become idle by carrier sensing in the wireless station increases. On the other hand, if the transmission power is lowered, since reception radio wave strength S at the SINR decreases, there is a concern that the transmission rate decreases, and there is a concern that the radio wave does not reach the interference source, and by reducing the transmission power, the interference intensity I at the communication partner with itself increases. If the reception sensitivity threshold is increased, there is a possibility that the interference intensity I at the communication partner with itself increases due to the hidden station problem, or there is a possibility that the opportunity to become idle with carrier sensing at another wireless station is significantly reduced due to the exposed station problem. In contrast, there is an idea of suppressing the increase in the interference intensity I to other wireless stations and the decrease in the chance of becoming idle with carrier sensing caused by increasing the reception sensitivity threshold, by lowering the transmission power by the amount that the reception sensitivity threshold is increased, by reducing the transmission power.

Figure 12:
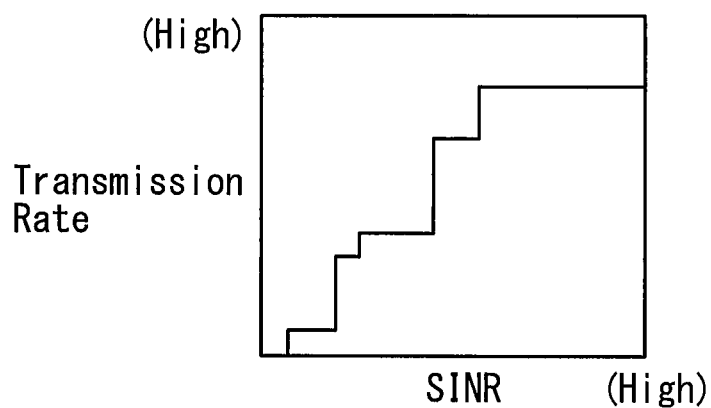
FIG. 12 is a flowchart illustrating a relationship between SINR and a transmission rate.
Figure 13:
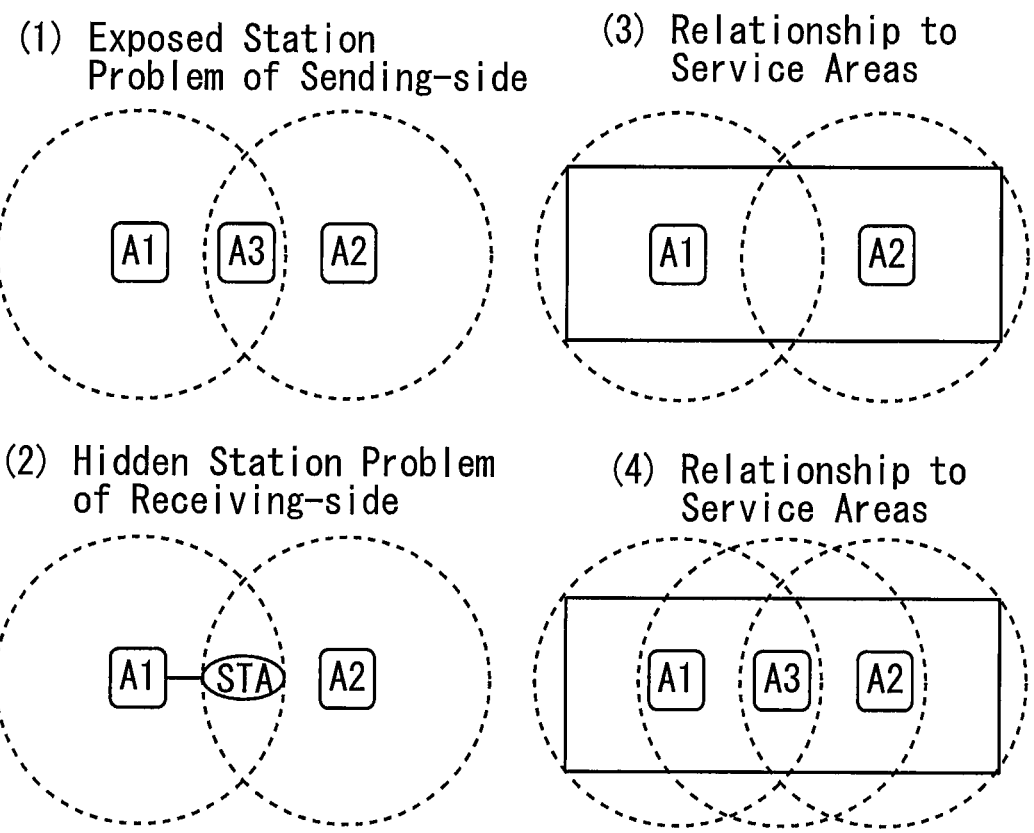
FIG. 13 is a diagram for describing a hidden station problem/exposed station problem.

As the relationship between the SINR and the transmission rate, there is a case where the relationship is not linear as illustrated in FIG. 12. In this case, the decrease of the transmission rate is not linear with respect to the decrease of the reception radio wave strength S and the increase of the interference intensity I, and an area where the transmission rate does not decrease or is relatively small occurs. In this area, even if the transmission power is lowered, there is a higher possibility that the merit that I in another wireless station is lowered or the opportunity to become idle with carrier sensing increases appears to be greater than the demerit due to the decrease in transmission rate according to the decreases in S. Accordingly, it is considered that the SINR having a large merit is targeted, and the decrease of S and the decrease of I are linked with each other, and thus S (hereinafter referred to as a target S) which is the target is assumed.

Figure 10:
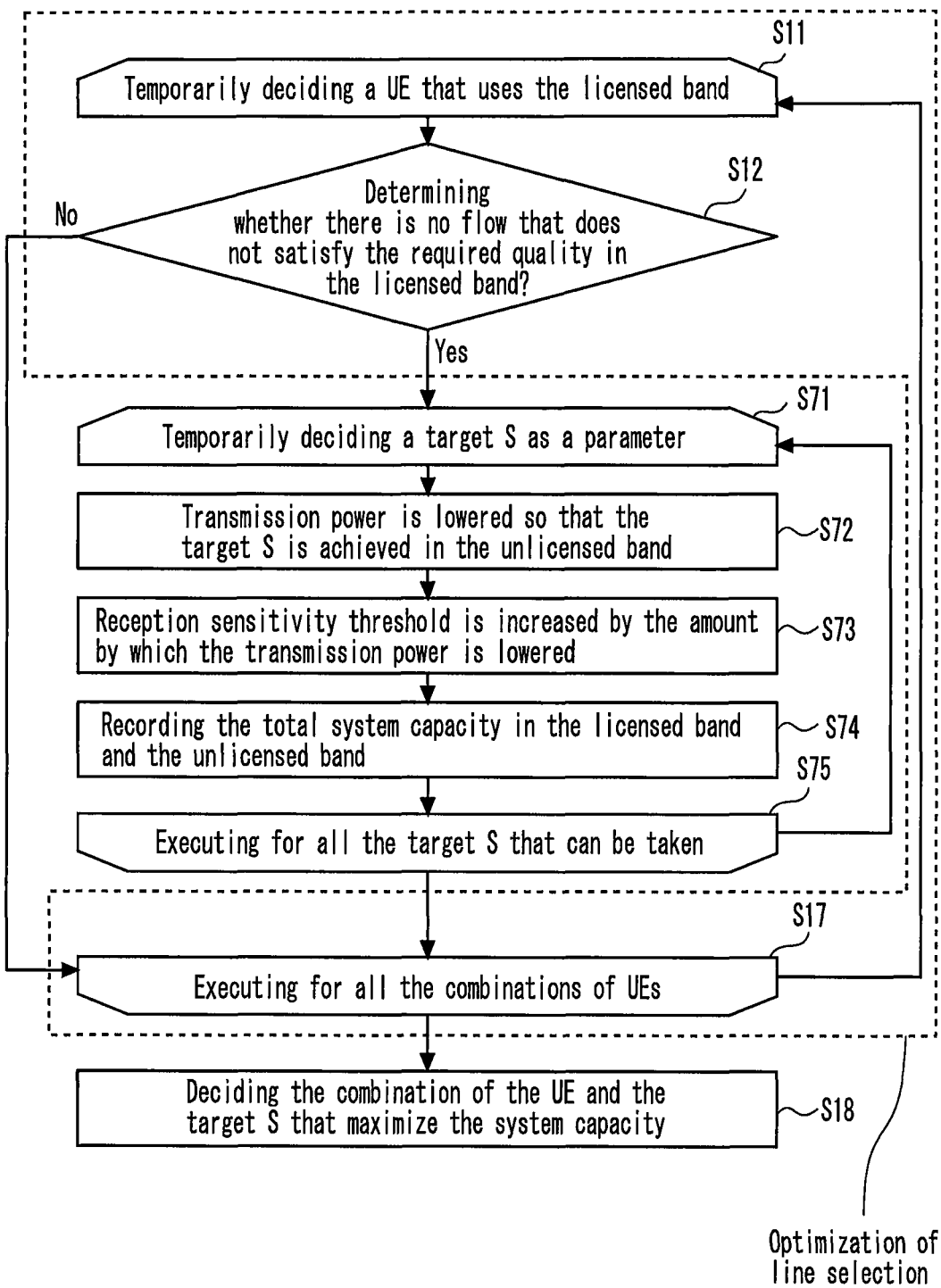
FIG. 10 is a flowchart illustrating a procedure example 1 for narrowing down unlicensed band parameter temporary decision.

FIG. 10 illustrates a procedure example 1 for narrowing down unlicensed band parameter temporary decision. In FIG. 10, in the system of unlicensed band in which the relationship between the SINR and the transmission rate is not a linear relationship, the target S for an AP and an STA or UE is temporarily decided as a parameter (S71), and the transmission power is lowered or increased so as to be the target S for the AP and the STA or UE in the unlicensed band (S72). After that, the reception sensitivity threshold is increased or decreased by the amount by which the transmission power is lowered or increased (S73), and the total system capacity of the licensed band and the unlicensed band is recorded (S74). By performing this within the range of the target S that can be taken (S75), it becomes possible to narrow down only the optimization of the target S.

(2) Frequency and Frequency Width

For the frequency width, the wider the frequency width, the wider the communication band, but the number of wireless stations that use the same frequency at the same time increases, and the probability of the hidden station problem/exposed station problem occurring by using the same frequency increases.

When one that is influenced by the hidden station problem/exposed station problem is a UE, the corresponding UE can be made to use the licensed band. Accordingly, if the UE existing in a place where the hidden station problem/exposed station problem occurs can be allowed to use the licensed band, the frequency width can be widened.

However, when the STA exist in the service area, the STA cannot follow the deterioration of the communication quality due to the hidden station problem/exposed station problem, there is a case where the band expansion is not desirable, and thus it is necessary to consider the existence of the STA in the service area. Accordingly, if information on the distribution and number of STAs is used, it is possible to narrow down the selectable frequencies and frequency widths.

The more APs to which the UE and STA belong, the smaller the bandwidth that each UE and STA can use. In this case, since the S is high, the SINR is high, and even in the situation where the hidden station problem/exposed station problem does not occur, the probability that a flow that does not satisfy the required quality occurs in the unlicensed band is high. In this situation, for example, in the optimization calculation of FIG. 4, there is a high possibility that a case where the unlicensed band is selected is brought over, despite the waste of calculation resources and the decrease in accuracy in line selection in FIGS. 7 to 9 due to leakage of the condition that there is no flow that does not satisfy the required quality in the unlicensed band, that is, the flow that does not satisfy the required quality in the unlicensed band. From these facts, it is possible to expect reduction of calculation resource waste and improvement of accuracy by giving a wide frequency width preferentially in order from the AP having the largest number of belonging UEs/STAs.

Figure 11:
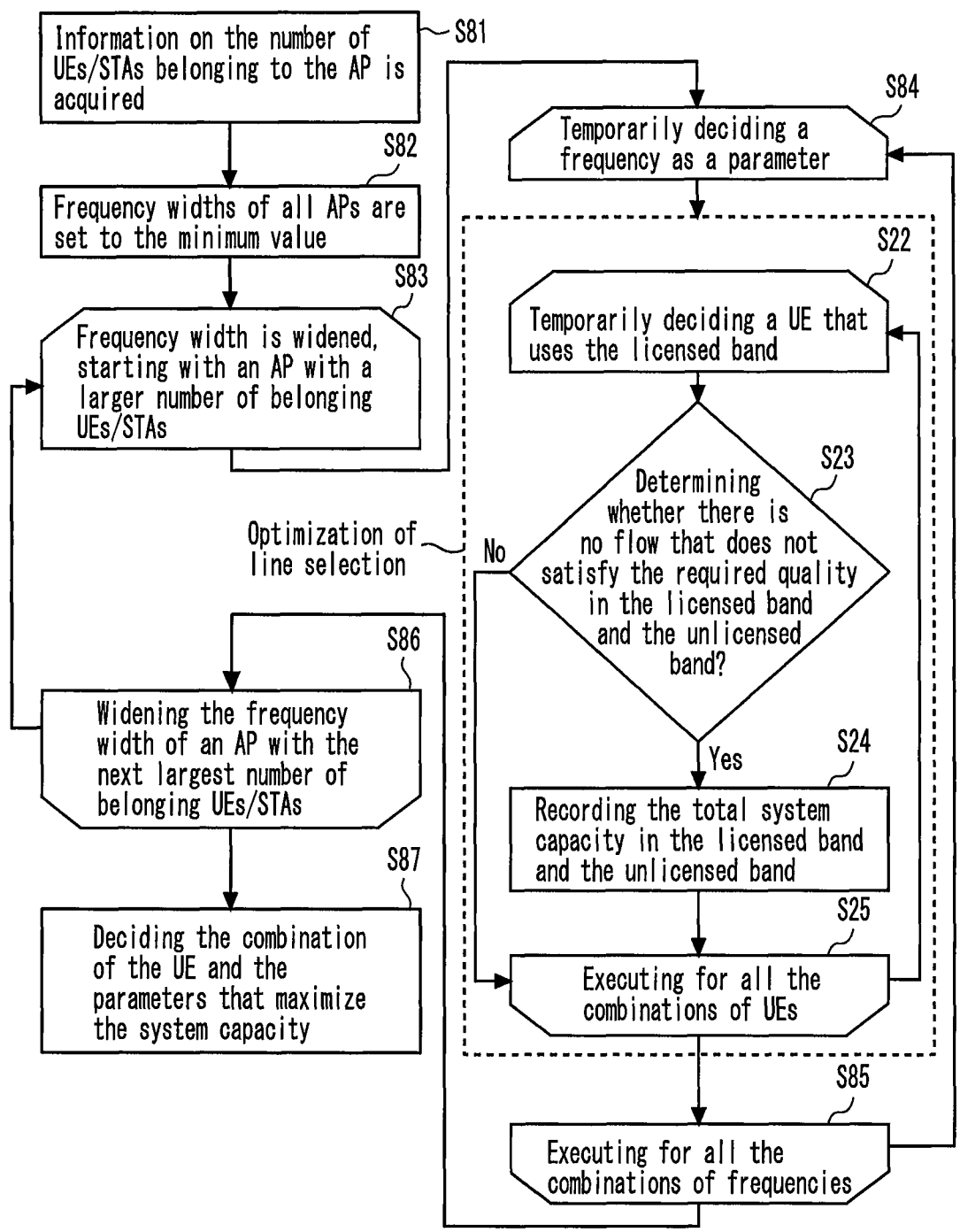
FIG. 11 is a flowchart illustrating a procedure example 2 for narrowing down the unlicensed band parameter temporary decision.

FIG. 11 illustrates a procedure example 2 for narrowing down the unlicensed band parameter temporary decision. In FIG. 11, information on the number of UEs/STAs belonging to the AP is acquired (S81), the frequency widths of all APs are set to the minimum value (S82), the frequency width is widened in order from the AP having the largest number of belonging UEs/STAs (S83), the frequency is temporarily decided as a parameter (84), and line selection optimization processing (S22 to S25) Illustrated in FIG. 4 is executed. This is performed for all the combinations of frequencies (S85), the frequency width of the AP, which has the second largest number of belonging UEs/STAs, is widened and the same processing is repeated (S86), the UE that uses the licensed band in which the system capacity is maximized and the parameters of the unlicensed band are decided (S87).

It is noted that in the example of narrowing down the UE line temporary decision illustrated in FIGS. 7 to 9 and the example of narrowing down the unlicensed band parameter temporary decision illustrated in FIGS. 10 to 11, in a service area where many wireless stations that can obtain a large lumping effect exist, in the situation where the distribution and number of APs. STAs and UEs using the unlicensed band are similar, even if the detailed arrangement of STAs or UEs changes, it is highly possible that the same improvement effect of system capacity is obtained even if the optimum value calculated in the past is reused. Accordingly, instead of the optimization calculation, it is also possible to make a setting by using a table of UE line selections and unlicensed band parameters, which are prepared in advance with the distribution and the number of units as indexes. Further, each narrowing-down method may be combined to further simplify the optimization calculation.

REFERENCE SIGNS LIST 10 base station AP) of an unlicensed band
11 unlicensed band communication unit
12 unlicensed band parameter changing unit
20 base station (BS) of a licensed band
21 licensed band communication unit
22 UE/radio resource management unit
30 terminal station (STA) corresponding to unlicensed band
31 unlicensed band communication unit
40 terminal station (UE) corresponding to unlicensed band and licensed band
41 unlicensed band communication unit
42 licensed band communication unit
43 line changing unit
44 licensed band information grasping/notifying unit
50 management server
51 unlicensed band parameter instruction unit
52 UE line instruction unit
53 line•parameter decision unit
531 UE line temporary decision unit
532 unlicensed band parameter temporary decision unit
533 licensed band quality estimation unit
534 unlicensed band quality estimation unit
535 system capacity calculation unit
536 line•parameter final decision unit
54 UE/radio resource management information reception unit
55 UE licensed band information reception unit

The invention claimed is:

1. A wireless communication control method, in which a base station (AP) of an unlicensed band, a base station (BS) of a licensed band, one or more terminal stations (STAs) of the unlicensed band, and two or more terminal stations (UEs) operable in the licensed band and the unlicensed band are provided and a management server manages the unlicensed band, the method includes:

identifying, by the management server, a given terminal station from the two or more terminal stations (UEs), said given terminal station using the licensed band; and optimizing, by the management server, parameters of the unlicensed band for a group of terminal stations, where the group of terminal stations includes one or more STAs and one or more UEs but excludes the given terminal station.

2. The wireless communication control method according to claim 1, wherein a pattern when a total of a communication capacity in the unlicensed band and a communication capacity in the licensed band after the optimization of the parameters of the unlicensed band becomes high is adopted for channel selection of the UEs, and the parameters of the unlicensed band after the optimization of the channel selection are set for the AP, the STAs, and the UEs of the unlicensed band.

3. The wireless communication control method according to claim 1, wherein a transmission power, a reception sensitivity threshold, a frequency, and a frequency width are adjusted as the parameters of the unlicensed band, a parameter that allows a low transmission rate and occurrence of a hidden station problem/exposed station problem is set for a place where the STAs or the UEs that uses the unlicensed band does not exist in a service area of the AP.

4. The wireless communication control method according to claim 1, wherein selection of the UEs that uses the licensed band is decided based on information on a radio wave strength between a connecting AP and the UEs, information on the radio wave strength between a neighboring AP of the UEs and a neighboring AP of the connecting AP, and information on an amount of communication in the connecting AP, the neighboring AP of the UEs, and the neighboring AP of the connecting AP.

5. A wireless communication system including a base station (AP) of an unlicensed band, a base station (BS) of a licensed band, one or more terminal stations (STAs) of the unlicensed band, two or more terminal stations (UEs) corresponding to the licensed band and the unlicensed band, and a management server that manages the unlicensed band, wherein the management server comprises:
　　a processor; and
　　a storage medium having computer program instructions stored thereon, when executed by the processor, perform to:
　　identifying a given terminal station from the two or more terminal stations (UEs), said given terminal station using the licensed band; and
　　optimizing parameters of the unlicensed band for a group of terminal stations, where the group of terminal stations includes one or more STAs and one or more UEs but excludes the given terminal station.

6. The wireless communication system according to claim 5, wherein the computer program instructions further perform to adopt a pattern when a total of a communication capacity in the unlicensed band and a communication capacity in the licensed band after the optimization of the parameters of the unlicensed band becomes high for channel selection of the UEs, and set the parameters of the unlicensed band after the optimization of the channel selection for the AP, the STAs, and the UEs of the unlicensed band.

7. The wireless communication system according to claim 5, wherein the computer program instructions further perform to adjust a transmission power, a reception sensitivity threshold, a frequency, and a frequency width as the parameters of the unlicensed band, and set a parameter that allows a low transmission rate and occurrence of a hidden station problem/exposed station problem for a place where the STAs or the UEs that uses the unlicensed band does not exist in a service area of the AP.

8. The wireless communication system according to claim 5, wherein the computer program instructions further perform to decide selection of the UEs that uses the licensed band based on information on a radio wave strength between a connecting AP and the UEs, information on the radio wave strength between a neighboring AP of the UEs and a neighboring AP of the connecting AP, and information on an amount of communication in the connecting AP, the neighboring AP of the UEs, and the neighboring AP of the connecting AP.

9. A management server that manages an unlicensed band of a wireless communication system including a base station (AP) of the unlicensed band, a base station (BS) of the licensed band, one or more terminal stations (STAs) of the unlicensed band, two or more terminal stations (UEs) corresponding to the licensed band and the unlicensed band, and the management server, the management server comprising:
　　a processor; and
　　a storage medium having computer program instructions stored thereon, when executed by the processor, perform to:
　　identifying a given terminal station from the two or more terminal stations (UEs), said given terminal station using the licensed band; and
　　optimizing parameters of the unlicensed band for a group of terminal stations, where the group of terminal stations includes one or more STAs and one or more UEs but excludes the given terminal station.

10. The management server according to claim 9, wherein the computer program instructions further perform to adopt a pattern when a total of a communication capacity in the unlicensed band and a communication capacity in the licensed band after the optimization of the parameters of the unlicensed band becomes high for channel selection of the UEs, and set the parameters of the unlicensed band after the optimization of the channel selection for the AP, the STAs, and the UEs of the unlicensed band.

11. The management server according to claim 9, wherein the computer program instructions further perform to adjust a transmission power, a reception sensitivity threshold, a frequency, and a frequency width as the parameters of the unlicensed band, and set a parameter that allows a low transmission rate and occurrence of a hidden station problem/exposed station problem for a place where the STAs or the UEs that uses the unlicensed band does not exist in a service area of the AP.

12. The management server according to claim 9, wherein the computer program instructions further perform to decide selection of the UEs that uses the licensed band based on information on a radio wave strength between a connecting AP and the UEs, information on the radio wave strength between a neighboring AP of the UEs and a neighboring AP of the connecting AP, and information on an amount of communication in the connecting AP, the neighboring AP of the UEs, and the neighboring AP of the connecting AP.

\* \* \* \* \*